(12) United States Patent
Jhawar et al.

(10) Patent No.: US 10,936,872 B2
(45) Date of Patent: Mar. 2, 2021

(54) HANDS-FREE CONTEXTUALLY AWARE OBJECT INTERACTION FOR WEARABLE DISPLAY

(71) Applicant: RealWear, Incorporated, Milpitas, CA (US)

(72) Inventors: Sanjay Subir Jhawar, Menlo Park, CA (US); Christopher Iain Parkinson, Richland, WA (US); Kenneth Lustig, Mercer Island, WA (US)

(73) Assignee: REALWEAR, INC., Vancouver, WA (US)

( * ) Notice: Subject to any disclaimer, the term of this patent is extended or adjusted under 35 U.S.C. 154(b) by 0 days.

(21) Appl. No.: 15/697,214

(22) Filed: Sep. 6, 2017

(65) Prior Publication Data
US 2018/0181810 A1    Jun. 28, 2018

Related U.S. Application Data

(63) Continuation-in-part of application No. 15/390,389, filed on Dec. 23, 2016.

(51) Int. Cl.
G06F 3/048 (2013.01)
G06K 9/00 (2006.01)
(Continued)

(52) U.S. Cl.
CPC ......... *G06K 9/00671* (2013.01); *G06F 1/163* (2013.01); *G06F 3/011* (2013.01);
(Continued)

(58) Field of Classification Search
CPC ... G06K 9/00671; G06F 3/0482; G06F 3/167; G06F 3/012; G06F 1/163; G06F 3/011
(Continued)

(56) References Cited

U.S. PATENT DOCUMENTS

| | | |
|---|---|---|
| 4,944,361 A | 7/1990 | Lindgren et al. |
| 5,046,192 A | 9/1991 | Ryder |

(Continued)

FOREIGN PATENT DOCUMENTS

| | | |
|---|---|---|
| CN | 101156104 A | 4/2008 |
| CN | 101518097 A | 8/2009 |

(Continued)

OTHER PUBLICATIONS

International Search Report and Written Opinion dated Apr. 13, 2018 in International Patent Application No. PCT/US2017/064904, 13 pages.

(Continued)

*Primary Examiner* — Renee D Chavez
*Assistant Examiner* — Jianmei F Duckworth
(74) *Attorney, Agent, or Firm* — Shook, Hardy & Bacon L.L.P.

(57) ABSTRACT

Systems and methods provide for object interaction based on an identified context. A wearable device, such as a head-mounted display device (HMD), is initiated. The HMD can obtain data via one or more sensors that corresponds to one or more non-human-machine interface (HMI) devices or objects. Based on the obtained data, the HMD can recognize and identify the non-HMI devices within an optically-encoded field of view of the HMD. The non-HMI devices can be viewed through the HMD along with virtual objects or identifiers associated therewith, and the virtual objects or identifiers can reference the viewed non-HMI devices. One or more commands associated with the virtual objects or indicators can then be received by the HMD to enable interaction with the viewed non-HMI devices. Based on the commands information can be provided for display or audio output.

20 Claims, 12 Drawing Sheets

(51) Int. Cl.
*G06F 1/16* (2006.01)
*G06F 3/01* (2006.01)
*G06F 3/0482* (2013.01)
*G06F 3/16* (2006.01)

(52) U.S. Cl.
CPC ............ *G06F 3/012* (2013.01); *G06F 3/0482* (2013.01); *G06F 3/167* (2013.01)

(58) Field of Classification Search
USPC ....................................................... 715/708
See application file for complete search history.

(56) References Cited

U.S. PATENT DOCUMENTS

| | | |
|---|---|---|
| 5,185,807 A | 2/1993 | Bergin et al. |
| 5,694,562 A | 12/1997 | Fisher |
| 5,767,820 A | 6/1998 | Bassett et al. |
| 5,796,374 A | 8/1998 | Cone et al. |
| 5,796,404 A | 8/1998 | Gentner |
| 5,806,079 A | 9/1998 | Rivette et al. |
| 5,815,126 A | 9/1998 | Fan et al. |
| 5,850,211 A | 12/1998 | Tognazzini |
| 5,882,137 A | 3/1999 | Epp et al. |
| 5,977,935 A | 11/1999 | Yasukawa et al. |
| 6,061,064 A | 5/2000 | Reichlen |
| 6,114,978 A | 9/2000 | Hoag |
| 6,198,462 B1 | 3/2001 | Daily et al. |
| 6,204,974 B1 | 3/2001 | Spitzer |
| 6,352,228 B1 | 3/2002 | Buerklin |
| 6,434,250 B1 | 8/2002 | Tsuhako |
| 6,456,262 B1 | 9/2002 | Bell |
| 6,489,976 B1 | 12/2002 | Patil et al. |
| 6,496,842 B1 | 12/2002 | Lyness |
| 6,587,700 B1 | 7/2003 | Meins et al. |
| 6,637,883 B1 | 10/2003 | Tengshe et al. |
| 6,708,339 B1 | 3/2004 | Smith |
| 6,747,611 B1 | 6/2004 | Budd et al. |
| 6,867,752 B1 | 3/2005 | Yamazaki et al. |
| 7,103,841 B2 | 9/2006 | Ronkainen et al. |
| 7,113,170 B2 | 9/2006 | Lauper et al. |
| 7,124,425 B1 | 10/2006 | Anderson, Jr. et al. |
| 7,134,094 B2 | 11/2006 | Stabb et al. |
| 7,243,309 B2 | 7/2007 | Koay et al. |
| 7,245,737 B2 | 7/2007 | Amae et al. |
| 7,290,220 B2 | 10/2007 | Bhogal et al. |
| 7,315,988 B2 | 1/2008 | Cragun et al. |
| 7,353,464 B1 | 4/2008 | Kundu et al. |
| 7,453,451 B1 | 11/2008 | Maguire, Jr. |
| 7,613,292 B2 | 11/2009 | te Riet |
| 7,661,074 B2 | 2/2010 | Sadler et al. |
| 7,849,397 B1 | 12/2010 | Ahmed |
| 7,853,050 B2 | 12/2010 | Wang et al. |
| 7,928,926 B2 | 4/2011 | Yamamoto et al. |
| 7,962,344 B2 | 6/2011 | Sharpe et al. |
| 8,051,105 B1 | 11/2011 | Johnson |
| 8,378,924 B2 | 2/2013 | Jacobsen et al. |
| 8,432,400 B1 | 4/2013 | Weskamp |
| 8,531,355 B2 | 9/2013 | Maltz |
| 8,549,443 B2 | 10/2013 | Irvine |
| 8,643,951 B1 | 2/2014 | Wheeler et al. |
| 8,706,685 B1 | 4/2014 | Smith et al. |
| 8,743,021 B1 | 6/2014 | Park et al. |
| 8,751,969 B2 | 6/2014 | Matsuda et al. |
| 8,855,719 B2 | 10/2014 | Jacobsen et al. |
| 8,922,481 B1 | 12/2014 | Kauffmann et al. |
| 8,929,589 B2 | 1/2015 | Publicover et al. |
| 8,990,682 B1 | 3/2015 | Wong et al. |
| 9,075,249 B2 | 7/2015 | Heinrich et al. |
| 9,122,307 B2 | 9/2015 | Jacobsen et al. |
| 9,134,793 B2 | 9/2015 | McDonald et al. |
| 9,158,115 B1 | 10/2015 | Worley et al. |
| 9,164,588 B1 | 10/2015 | Johnson et al. |
| 9,240,069 B1 | 1/2016 | Li |
| 9,285,872 B1 | 3/2016 | Raffle et al. |
| 9,294,607 B2 | 3/2016 | Jacobsen et al. |
| 9,301,085 B2 | 3/2016 | Parkinson et al. |
| 9,377,852 B1 | 6/2016 | Shapiro et al. |
| 9,377,862 B2 | 6/2016 | Parkinson et al. |
| 9,442,631 B1 | 9/2016 | Patel et al. |
| 9,477,888 B1 | 10/2016 | Lewis |
| 9,500,867 B2 | 11/2016 | Hennelly et al. |
| 9,588,593 B2 | 3/2017 | Li |
| 9,615,067 B1 | 4/2017 | Foote et al. |
| 9,658,451 B2 | 5/2017 | Kobayashi |
| 9,817,232 B2 | 11/2017 | Lindley et al. |
| 9,823,742 B2 | 11/2017 | Parker et al. |
| 9,904,369 B2 | 2/2018 | Lai et al. |
| 9,913,302 B2 | 3/2018 | Parkinson et al. |
| 9,916,006 B2 | 3/2018 | Maltz |
| 9,940,754 B2 | 4/2018 | Kuribara |
| 9,946,079 B2 | 4/2018 | Ozeki |
| 10,013,053 B2 | 7/2018 | Cederlund et al. |
| 10,013,976 B2 | 7/2018 | Woodall et al. |
| 10,048,750 B2 | 8/2018 | Du et al. |
| 10,078,416 B2 | 9/2018 | Tsuda |
| 10,255,101 B2 | 4/2019 | Zielinski et al. |
| 10,275,023 B2 | 4/2019 | Mckenzie et al. |
| 10,288,908 B2 | 5/2019 | Calilung et al. |
| 10,540,064 B1 | 1/2020 | Chasin |
| 2002/0015008 A1 | 2/2002 | Kishida et al. |
| 2002/0037770 A1 | 3/2002 | Paul et al. |
| 2002/0044152 A1 | 4/2002 | Abbott, III et al. |
| 2002/0190947 A1 | 12/2002 | Feinstein |
| 2003/0020707 A1 | 1/2003 | Kangas et al. |
| 2003/0174170 A1 | 9/2003 | Jung et al. |
| 2003/0182713 A1 | 10/2003 | Rolla |
| 2003/0184585 A1 | 10/2003 | Lin et al. |
| 2004/0008158 A1 | 1/2004 | Chi et al. |
| 2004/0218776 A1 | 11/2004 | Rolla |
| 2004/0252119 A1 | 12/2004 | Hunleth et al. |
| 2005/0015730 A1 | 1/2005 | Gunturi et al. |
| 2005/0071171 A1 | 3/2005 | Dvorak |
| 2005/0083248 A1 | 4/2005 | Biocca et al. |
| 2005/0146488 A1 | 7/2005 | Travers et al. |
| 2006/0044265 A1 | 3/2006 | Min |
| 2006/0048286 A1 | 3/2006 | Donato |
| 2006/0074980 A1 | 4/2006 | Sarkar |
| 2006/0085765 A1 | 4/2006 | Peterson et al. |
| 2007/0024507 A1 | 2/2007 | Kasamatsu et al. |
| 2007/0052672 A1 | 3/2007 | Ritter et al. |
| 2007/0130547 A1 | 6/2007 | Boillot |
| 2007/0171193 A1 | 7/2007 | Nakamura |
| 2007/0183616 A1 | 8/2007 | Wahl et al. |
| 2007/0211023 A1 | 9/2007 | Boillot |
| 2007/0220108 A1 | 9/2007 | Whitaker |
| 2009/0099836 A1 | 4/2009 | Jacobsen et al. |
| 2009/0100732 A1 | 4/2009 | Seidler |
| 2009/0128448 A1 | 5/2009 | Riechel |
| 2009/0154990 A1 | 6/2009 | Julliere |
| 2009/0182562 A1 | 7/2009 | Caire et al. |
| 2009/0195652 A1 | 8/2009 | Gal |
| 2009/0300506 A1 | 12/2009 | Drucker et al. |
| 2010/0036665 A1 | 2/2010 | Bess et al. |
| 2010/0194350 A1 | 8/2010 | Chatterjee et al. |
| 2010/0259471 A1 | 10/2010 | Takano et al. |
| 2010/0315329 A1 | 12/2010 | Previc et al. |
| 2010/0328204 A1 | 12/2010 | Edwards et al. |
| 2011/0001699 A1 | 1/2011 | Jacobsen et al. |
| 2011/0090135 A1 | 4/2011 | Tricoukes et al. |
| 2011/0187640 A1 | 8/2011 | Jacobsen et al. |
| 2011/0249122 A1 | 10/2011 | Tricoukes et al. |
| 2012/0002046 A1 | 1/2012 | Rapoport et al. |
| 2012/0019662 A1 | 1/2012 | Maltz |
| 2012/0050143 A1 | 3/2012 | Border et al. |
| 2012/0062444 A1 | 3/2012 | Cok et al. |
| 2012/0068914 A1 | 3/2012 | Jacobsen et al. |
| 2012/0086624 A1 | 4/2012 | Thompson et al. |
| 2012/0114131 A1 | 5/2012 | Tricoukes et al. |
| 2012/0151349 A1 | 6/2012 | Hahm et al. |
| 2012/0192065 A1 | 7/2012 | Migos et al. |
| 2012/0235896 A1 | 9/2012 | Jacobsen et al. |
| 2012/0235902 A1 | 9/2012 | Eisenhardt et al. |
| 2012/0236025 A1 | 9/2012 | Jacobsen et al. |

(56) References Cited

U.S. PATENT DOCUMENTS

| | | |
|---|---|---|
| 2012/0272179 A1 | 10/2012 | Stafford |
| 2012/0272484 A1 | 11/2012 | Willborn |
| 2012/0287284 A1 | 11/2012 | Jacobsen et al. |
| 2013/0007672 A1 | 1/2013 | Taubman |
| 2013/0007686 A1 | 1/2013 | Lu |
| 2013/0021269 A1 | 1/2013 | Johnson et al. |
| 2013/0047322 A1 | 2/2013 | Peebles |
| 2013/0054576 A1 | 2/2013 | Karmarkar et al. |
| 2013/0069985 A1 | 3/2013 | Wong et al. |
| 2013/0089214 A1 | 4/2013 | Tricoukes et al. |
| 2013/0090062 A1 | 4/2013 | Tricoukes et al. |
| 2013/0135353 A1 | 5/2013 | Wheeler et al. |
| 2013/0169514 A1 | 7/2013 | Edwards et al. |
| 2013/0187835 A1 | 7/2013 | Vaught et al. |
| 2013/0231937 A1 | 9/2013 | Woodall et al. |
| 2013/0239000 A1 | 9/2013 | Parkinson et al. |
| 2013/0241805 A1 | 9/2013 | Gomez |
| 2013/0246967 A1 | 9/2013 | Wheeler et al. |
| 2013/0285886 A1 | 10/2013 | Pombo et al. |
| 2013/0288753 A1 | 10/2013 | Jacobsen et al. |
| 2013/0307797 A1 | 11/2013 | Taguchi et al. |
| 2013/0321255 A1 | 12/2013 | Lamb et al. |
| 2013/0326208 A1 | 12/2013 | Jacobsen et al. |
| 2014/0000015 A1 | 1/2014 | Arai |
| 2014/0002341 A1 | 1/2014 | Nister et al. |
| 2014/0002357 A1 | 1/2014 | Pombo et al. |
| 2014/0028923 A1 | 1/2014 | Griffin et al. |
| 2014/0043214 A1 | 2/2014 | Park et al. |
| 2014/0058733 A1 | 2/2014 | Voorhees et al. |
| 2014/0092018 A1 | 4/2014 | Geithner |
| 2014/0098132 A1 | 4/2014 | Fein et al. |
| 2014/0111427 A1 | 4/2014 | Lindley et al. |
| 2014/0153173 A1 | 6/2014 | Pombo et al. |
| 2014/0195247 A1 | 7/2014 | Parkinson et al. |
| 2014/0237366 A1 | 8/2014 | Poulos et al. |
| 2014/0240245 A1 | 8/2014 | Kim |
| 2014/0253605 A1 | 9/2014 | Border et al. |
| 2014/0267419 A1* | 9/2014 | Ballard ................. G06T 11/00 345/633 |
| 2014/0268054 A1 | 9/2014 | Olsson et al. |
| 2014/0282118 A1 | 9/2014 | Kumamoto |
| 2014/0282144 A1 | 9/2014 | Maicocci |
| 2014/0282278 A1 | 9/2014 | Anderson et al. |
| 2014/0294302 A1 | 10/2014 | King et al. |
| 2014/0375544 A1 | 12/2014 | Venable et al. |
| 2014/0380230 A1 | 12/2014 | Venable et al. |
| 2015/0007114 A1 | 1/2015 | Poulos et al. |
| 2015/0009132 A1 | 1/2015 | Kuriya et al. |
| 2015/0102984 A1 | 4/2015 | Wong et al. |
| 2015/0130740 A1 | 5/2015 | Cederlund et al. |
| 2015/0138089 A1 | 5/2015 | Angerbauer et al. |
| 2015/0142440 A1 | 5/2015 | Parkinson et al. |
| 2015/0153571 A1 | 6/2015 | Ballard et al. |
| 2015/0199106 A1 | 7/2015 | Johnson |
| 2015/0206321 A1 | 7/2015 | Scavezze et al. |
| 2015/0213778 A1 | 7/2015 | Moravetz |
| 2015/0220142 A1 | 8/2015 | Parkinson et al. |
| 2015/0243288 A1 | 8/2015 | Katsuranis |
| 2015/0288666 A1 | 10/2015 | Rao et al. |
| 2015/0309316 A1 | 10/2015 | Osterhout et al. |
| 2015/0338914 A1 | 11/2015 | Andrysco |
| 2015/0378160 A1 | 12/2015 | Lee et al. |
| 2016/0004306 A1 | 1/2016 | Maltz |
| 2016/0026253 A1 | 1/2016 | Bradski et al. |
| 2016/0041619 A1 | 2/2016 | Ishiwata et al. |
| 2016/0062458 A1 | 3/2016 | Kristensson et al. |
| 2016/0077337 A1 | 3/2016 | Raffle et al. |
| 2016/0085077 A1 | 3/2016 | Milea et al. |
| 2016/0093105 A1 | 3/2016 | Rimon et al. |
| 2016/0124501 A1 | 5/2016 | Lam et al. |
| 2016/0162020 A1 | 6/2016 | Lehman et al. |
| 2016/0178912 A1 | 6/2016 | Kusuda et al. |
| 2016/0179855 A1 | 6/2016 | Roman et al. |
| 2016/0191172 A1 | 6/2016 | Masarik |
| 2016/0259862 A1 | 9/2016 | Navanageri et al. |
| 2016/0324248 A1 | 11/2016 | Winters et al. |
| 2016/0329634 A1 | 11/2016 | Osterhout et al. |
| 2016/0342782 A1* | 11/2016 | Mullins ................. G06F 21/32 |
| 2016/0370855 A1 | 12/2016 | Lanier et al. |
| 2017/0017464 A1 | 1/2017 | Roy |
| 2017/0060230 A1 | 3/2017 | Faaborg et al. |
| 2017/0092002 A1 | 3/2017 | Mullins et al. |
| 2017/0103680 A1 | 4/2017 | Campbell et al. |
| 2017/0115728 A1 | 4/2017 | Park et al. |
| 2017/0160812 A1 | 6/2017 | Park et al. |
| 2017/0168305 A1 | 6/2017 | Kusuda et al. |
| 2017/0337897 A1 | 11/2017 | Jung et al. |
| 2017/0344609 A1 | 11/2017 | Wadley et al. |
| 2017/0351393 A1 | 12/2017 | Ott et al. |
| 2017/0351778 A1 | 12/2017 | Sperling |
| 2018/0011326 A1 | 1/2018 | Ishizaki |
| 2018/0018073 A1 | 1/2018 | Lemay et al. |
| 2018/0088746 A1 | 3/2018 | Cheung et al. |
| 2018/0129276 A1* | 5/2018 | Nguyen ................. G09B 9/00 |
| 2018/0131907 A1 | 5/2018 | Schmirler et al. |
| 2018/0143756 A1* | 5/2018 | Mildrew ............... G06F 3/011 |
| 2018/0150204 A1 | 5/2018 | Macgillivray |
| 2018/0276896 A1 | 9/2018 | Launonen |
| 2018/0321493 A1 | 11/2018 | Kim et al. |
| 2018/0341627 A1 | 11/2018 | Moldovean et al. |
| 2018/0356884 A1 | 12/2018 | Lee |
| 2018/0373325 A1 | 12/2018 | Rosso et al. |

FOREIGN PATENT DOCUMENTS

| | | |
|---|---|---|
| CN | 205691887 U | 11/2016 |
| JP | 2004-247897 A | 9/2004 |
| JP | 2006-319440 A | 11/2006 |
| JP | 2009-033308 A | 2/2009 |
| JP | 2016-012838 A | 1/2016 |
| JP | 2016-054351 A | 4/2016 |
| WO | 00/55673 A1 | 9/2000 |

OTHER PUBLICATIONS

International Search Report and Written Opinion dated Apr. 20, 2018 in International Patent Application No. PCT/US2017/064904, 12 pages.

The RealWear HMI-1 can be used with both hard hat and safety glasses #safetyfirst #msasafety #iiot #wearables @realheadwear inc (Realwear Inc) Sep. 15, 2016 (Sep. 15, 2016), available at: <www.facebook.com/RealWearInc/>, entire document.

"Andy Lowery on the Industrial Internet" (Techonomy Media) Nov. 30, 2016 (Nov. 30, 2016), available at: <https://www.youtube.com/watch?v=OCIQM5aV5o4&feature=youtu.be>, entire document,especially at (2:10).

Non-Final Office Action dated Jan. 9, 2018 in U.S. Appl. No. 15/390,363, 14 pages.

International Search Report dated Feb. 16, 2018 in International Patent Application No. PCT/US2017/066656, 15 pages.

International Search Report and Written Opinion dated Jan. 19, 2018 in International Patent Application No. PCT/US2017/064898, 12 pages.

International Search Report and Written Opinion dated Feb. 23, 2018 in International Patent Application No. PCT/US2017/064905, 9 pages.

International Search Report and Written Opinion dated Mar. 5, 2018 in International Patent Application No. PCT/US2017/068123, 9 pages.

Final Office Action dated Aug. 2, 2018 in U.S. Appl. No. 15/390,363, 16 pages.

Non-Final Office Action dated Aug. 9, 2018 in U.S. Appl. No. 15/390,375, 8 pages.

Non-Final Office Action dated Sep. 26, 2018 in U.S. Appl. No. 15/390,380, 14 pages.

First Action Interview Pre-Interview Communication dated Feb. 19, 2019 in U.S. Appl. No. 15/390,191, 11 pages.

Notice of Allowance dated Mar. 21, 2019 in U.S. Appl. No. 15/390,380, 7 pages.

(56) References Cited

OTHER PUBLICATIONS

First Action Interview Office Action dated Apr. 12, 2019 in U.S. Appl. No. 15/390,191, 7 pages
Notice of Allowance dated Apr. 24, 2019 in U.S. Appl. No. 15/390,375, 7 pages.
Final Office Action dated May 2, 2019 in U.S. Appl. No. 15/390,389, 27 pages.
Notice of Allowance dated May 21, 2019 in U.S. Appl. No. 15/390,363, 7 pages.
International Preliminary Report on Patentability dated Jul. 4, 2019 in International Patent Application No. PCT/US2017/064898, 10 pages.
International Preliminary Report on Patentability dated Jul. 4, 2019 in International Patent Application No. PCT/US2017/064902, 7 pages.
International Preliminary Report on Patentability dated Jul. 4, 2019 in International Patent Application No. PCT/US2017/064904, 13 pages.
International Preliminary Report on Patentability dated Jul. 4, 2019 in International Patent Application No. PCT/US2017/064905, 7 pages.
International Preliminary Report on Patentability dated Jul. 4, 2019 in International Patent Application No. PCT/US2017/066656, 14 pages.
International Preliminary Report on Patentability dated Jul. 4, 2019 in International Patent Application No. PCT/US2017/068123, 8 pages.
First Action Interview Pre-Interview Communication dated Nov. 21, 2018 in U.S. Appl. No. 15/390,389, 8 pages.
Non-Final Office Action dated Dec. 5, 2018 in U.S. Appl. No. 15/390,363, 9 pages.
Final Office Action dated Feb. 1, 2019 in U.S. Appl. No. 15/390,375, 8 pages.
Non-Final Office Action dated Jan. 30, 2020 in U.S. Appl. No. 15/390,389, 22 pages.
Notice of Allowance dated Nov. 29, 2019 in U.S. Appl. No. 15/390,191, 9 pages.
International Search Report and Written Opinion dated Aug. 27, 2019 in International Patent Application No. PCT/US19/36124, 17 pages.
Extended European Search Report and Opinion received for European Patent Application No. 17882728.3, dated Jul. 2, 2020, 12 pages.
Extended European Search Report and Opinion received for European Patent Application No. 17884876.8, dated Jul. 7, 2020, 9 pages.
Extended European Search Report and Opinion received for European Patent Application No. 17884446.0, dated Aug. 3, 2020, 9 pages.
Supplementary Partial European Search Report received for European Patent Application No. 17882453.8, dated May 4, 2020, 17 pages.
Extended European Search Report received for European Patent Application No. 17884064.1, dated May 12, 2020, 10 pages.
Non-Final Office Action dated Jun. 1, 2020 in U.S. Appl. No. 16/007,773, 16 pages.
Final Office Action dated Jun. 1, 2020 in U.S. Appl. No. 15/390,389, 26 pages.
Extended European Search Report and Opinion received for European Patent Application No. 17885286.9, dated Sep. 17, 2020, 8 pages.
Extended European Search Report and Opinion received for European Patent Application No. 17882453.8, dated Oct. 19, 2020, 19 pages.
Non-Final Office Action dated Sep. 29, 2020 in U.S. Appl. No. 15/390,389, 28 pages.
Non-Final Office Action dated Nov. 6, 2020 in US. Appl. No. 16/584,285, 14 pages.
Final Office Action dated Dec. 10, 2020 in U.S. Appl. No. 16/007,773, 15 pages.
First Office Action and Search received for Chinese Patent Application No. 201780080132.1, dated Nov. 26, 2020, 22 pages.
International Preliminary Report on Patentability received for PCT Application No. PCT/US2019/036124, dated Dec. 24, 2020, 11 pages.

\* cited by examiner

HANDS-FREE CONTEXTUALLY AWARE OBJECT INTERACTION FOR WEARABLE DISPLAY

CROSS-REFERENCE TO RELATED APPLICATIONS

This application is a continuation-in-part to pending U.S. patent application Ser. No. 15/390,389, entitled "Context Based Content Navigation for Wearable Display." The entirety of the aforementioned application is incorporated in its entirety by reference herein.

BACKGROUND

In industrial settings a user may need to provide maintenance or perform other duties associated with complex equipment and be required to consult a large amount of technical documentation, which is generally provided to a user via binders, tablets, or laptops. There are, however, inherent inefficiencies associated with methodologies involving having to navigate and find the desired information this way. Finding required content through manual navigation or through touch-based systems can be an ineffective use of time and require a user to stop and restart tasks in order to do so.

Further, when a user runs one or more complex workflows or processes, many interrelated applications can be required to be used or, for example, a user can be required to learn certain information about various machines or devices, such as non-human-machine interface (HMI) devices (e.g., non-interactive devices, physical objects, and the like), either visually or audibly. In the industrial setting when a user is operating, inspecting, or maintaining equipment, finding the necessary applications or information can be traditionally complicated by the need for a user to use their hands which limits efficiency and effectiveness. Also, complex data and applications are often stored in difficult to manage hierarchical forms as there can be numerous data streams available to a user and as such can become unwieldy on traditional mobile devices. As such, there is a need for augmented reality dashboards that can implement what can be understood as personal control rooms for a user. For example when a user is looking at some equipment with hands free device information and applications can be presented to a user simultaneously with the equipment being worked on. This allows a worker to drill down through information and navigate applications required easily and safely even if they are using both hands to operate or manipulate various tools and equipment.

SUMMARY OF THE INVENTION

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

At a high level, embodiments of the technology described herein are generally directed to facilitating the access and the use of electronic content on a wearable device through hands-free operation. The wearable device can include an optical device (e.g. optical input/output device(s) and/or sensor(s)). In some embodiments, the wearable device can include a data transceiver (i.e. a data receiver and a data transmitter), and further, the wearable device can include a display device. In some embodiments, the wearable device is a head-mounted display (HMD) device.

In a situation where a user needs to easily access multiple documents or even further, multiple specific portions of multiple documents based on the context of a given situation, the methods and systems described herein provide a user to easily and efficiently navigate to specific views of content or portions of content. In various embodiments, collections of digital tags associated with content are utilized to navigate through the content. For example, based on a variety of contexts, sets of content can be prepared such that a user can easily pare down required data and navigate through only relevant documents for a given task. Thus herein is provided a contextually aware command driven navigation system for a user to navigate to various portions of documents; context is associated to a place where a user can access specific content, and based on that context specific documents or portions of documents can be retried and presented to a user. In various embodiments, a content navigation system is provided. The content navigation system generally comprising a wearable computing device with a display, a content repository comprising content, location sensors and/or transmitters and external computing devices which can be operably connected through a network. The content can include at least one associated digital tag, the digital tag associated further with a context. In various embodiments, the wearable device can be initialized and loaded, i.e. stored locally, with some content, the content including the digital tags. A digital tag can be conceptually comparable to a digital bookmark, allowing a computing device to, in a single step, advance to the marked portion of the content. The marked portion of content can be defined by any number of factors that drive viewing with a computing device, such as a particular piece of content, a page number, a zoom level, or coordinates on a page to name a few. Subsequently, a context for the wearable device is determined based on location, orientation, or other factors, and stored at the wearable device to aid in driving content navigation. Once a context for the wearable device is determined, digital tags can be presented to a user via a display that are selectable by a command, for example, a voice command. The digital tags associated with the content are presented to a user based on the determined context. As such, the context allows only certain digital tags to be presented to a user and thus allowing the user to navigate through the content based on presented digital tags. In this way the selection of one digital tag drives the presentation of another piece of content or portion of content and other associated digital tags. Further as user can add their own digital tags and annotations to content or portions of content. After use, the locally stored documents with potentially newly added information are synchronized back to a network server or content repository on the network. Subsequent users can then be able to utilize a previous user's digital tags, or in alternate embodiments, digital tags can be suggested to a subsequent user based on their prior usage in the determined context.

In some aspects of the technology described herein, a wearable device can determine a context, as described above, as well as receive optical input data which can, for example, determine a viewing position. In determining a viewing position, the wearable device can receive optical input data from an optical input device, and the received optical input data corresponds to one or more non-HMI devices and/or physical objects and subsequently generate image data corresponding to the non-HMI devices on a display element of the wearable device. By receiving optical input data in conjunction with the determined context, the wearable device, via the display element, can then generate and present a user with one or more virtual objects or indicators. The image data and virtual objects and/or indicators thus provide a user with an augmented reality (AR) dashboard or environment with which a user can interact. In some instances the virtual objects and/or indicators can be selectable by a user to launch one or more applications or navigate to stored content which can be related to the detected or recognized non-HMI devices. In certain instances, a virtual object can, for example, provide information about a given non-HMI device. Further, by using commands a user can retrieve data or information corresponding to the non-HMI devices.

When a wearable device is initialized, a user can activate a user profile. In some instances, the wearable device can retrieve and/or obtain one or more usernames/passwords that correspond to the active profile. In this way the wearable device can provide a user with a single sign on to allow the user to access and/or launch any number of applications or digital content. After a wearable device is initialized, the wearable device can receive contextual information (e.g. location) to determine a context for the wearable device and can also receive optical information based on the viewing position of the wearable device. A contextually based set of indicators/applications/links can then be presented to a user as computer-generated objects on a display of the wearable device. In this way, the wearable device can present the objects based on viewing position. The viewing position comprises at least a location and an orientation (e.g. a context of the wearable device and where a field-of-view of the wearable device is directed. Each virtual object presented to a user via the wearable device can be associated with one or more commands and/or prompts (e.g. one or more voice commands). When a command and/or prompt is detected or received by the wearable device while its corresponding virtual object is displayed one or more operations can be performed, for example the wearable device can then launch a corresponding application or set/subset of links. By interacting with the AR dashboard a user can effectively and efficiently navigate through content and applications needed for one or more tasks, or that are required for a process or workflow.

Additional objects, advantages, and novel features of the invention will be set forth in part in the description which follows, and in part will become apparent to those skilled in the art upon examination of the following, or can be learned by practice of the invention.

BRIEF DESCRIPTION OF THE DRAWINGS

The features of the invention noted above are explained in more detail with reference to the embodiments illustrated in the attached drawing figures, in which like reference numerals denote like elements, in which FIGS. 1-10 illustrate embodiments of the present invention and in which:

FIG. 1 provides a schematic diagram showing an exemplary operating environment for a content navigation system in accordance with some implementations of the present disclosure;

FIG. 2 provides a schematic diagram showing an exemplary content navigation system, in accordance with some implementations of the present disclosure;

FIG. 4 provides an illustrative process flow depicting a method for content navigation, in accordance with some implementations of the present disclosure;

FIG. 5 provides an illustrative process flow depicting a method for content navigation and tagging, in accordance with some implementations of the present disclosure;

FIG. 6 shows an exemplary head-mounted display device, in accordance with some implementations of the present disclosure.

FIG. 8 provides an illustrative process flow depicting a method for hands-free object interaction, in accordance with some implementations of the present disclosure.

FIG. 9 provides a block diagram of an exemplary wearable device in which some implementations of the present disclosure can be employed.

FIG. 10 provides a block diagram of an exemplary computing device in which some implementations of the present disclosure can be employed.

DETAILED DESCRIPTION

Figure 1:
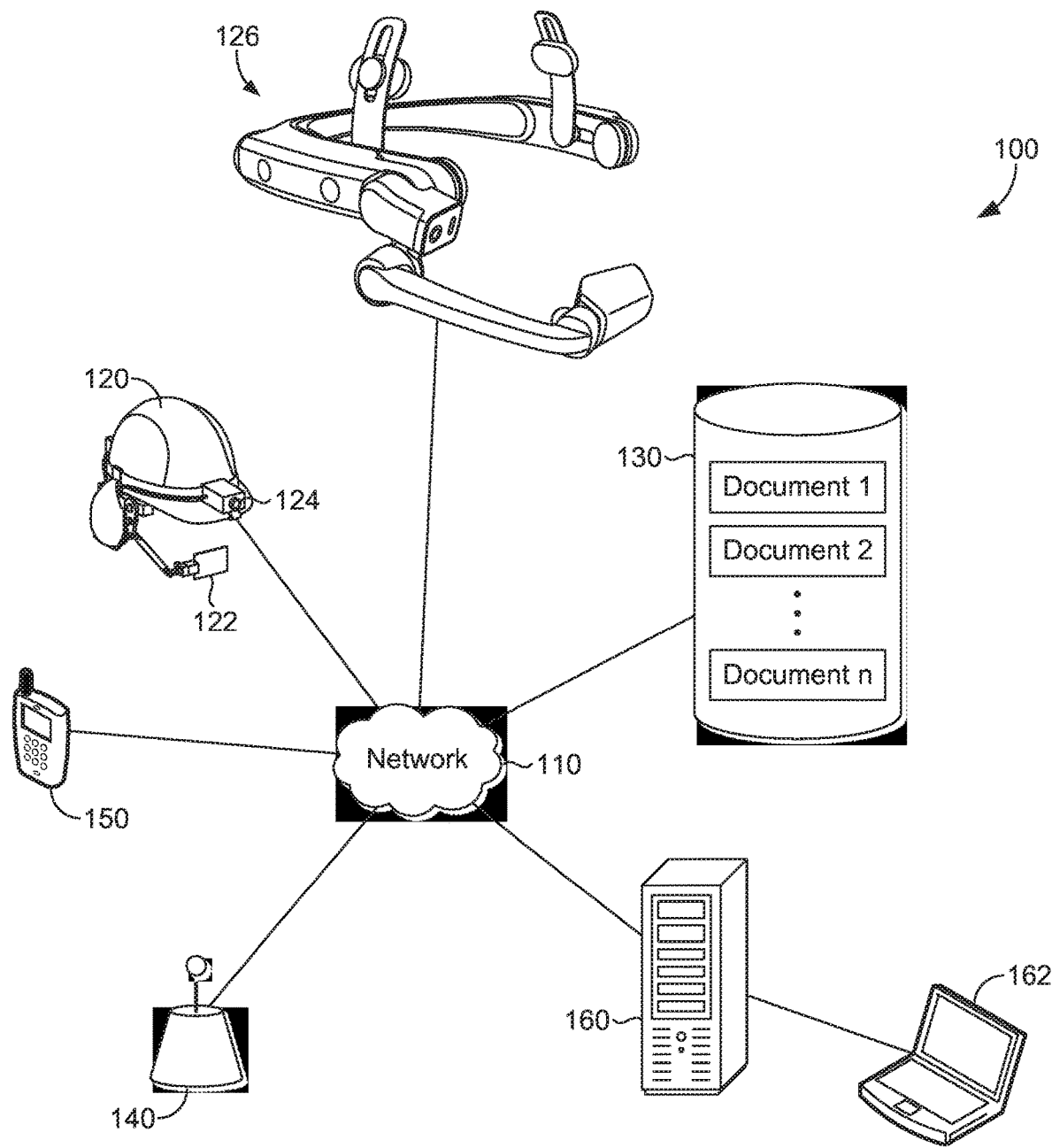

The ability to easily and efficiently access and navigate relevant content through the use of a wearable device is an important aspect for user workflow and operation in particular scenarios, for example, in industrial applications where a user needs to navigate a potentially large volume of content quickly and while maintaining interaction with the technology while concurrently engaged in other tasks. Further, the ability to utilize a wearable device in a hands-free context enables a user to effectively implement workflow processes and procedures as well as to interact with any number of devices, including both non-interactive devices (e.g. non-human-machine-interface (HMI) devices) and devices that include a human-machine interface (e.g. a device having a touch-screen display) detected by a wearable device which can be required to complete user tasks. Augmented reality dashboards that can implement what can be understood as personal control rooms for a user enable robust functionality for wearable devices. When a user is looking at some equipment with a hands-free device information and applications can be presented to a user simultaneously with the equipment being worked on. This allows a worker to drill down through information and navigate applications required even if they are using both hands to operate or manipulate various tools and equipment.

Utilizing a wearable device in accordance with embodiments of the present disclosure, such as, for example, a head-mounted computing device including a display, a user can view and navigate a large amount of documentation or other content using the display as a viewer. In accordance with some embodiments of the present disclosure, the display acts as a window onto a larger virtual space, allowing a user to navigate to a specified page within a specific document, zoom into and out of a page achieving various levels of magnification, and utilize hands-free movements to pan longitudinally or vertically over a page to arrive at desired XY coordinate of a stationary document within the larger virtual space.

In accordance with some embodiments of the present disclosure, the navigation described above can be enhanced through the use of digital tags used in conjunction with voice commands. For example, through a voice command (i.e. natural language interaction), a user can navigate directly to a specific document (or file), page within the document, XY coordinate on the page, and a zoom level, where any combination of variables can be embedded as metadata within an associated digital tag. In this way, a user can navigate content and specific views of that content through the efficient use of digital tagging in conjunction with voice accessibility.

In some embodiments of the present disclosure, location and orientation information can be utilized to further drive content navigation. For example, the digital tags as previously described can be associated with a specific place and/or orientation to provide context for a user. Using determined contextual information, a wearable device can automatically present a set or subset of digital tags for a user to navigate content with. In this way, a digital tag can be associated to the content as well as a location and direction.

As such, embodiments of the present invention are directed towards accessing and navigating content based on contextual determinations using a wearable device, for example a head-mounted computing device. In this way, aspects of the present disclosure relate to devices, methods, and systems that facilitate hands-free interaction with various content and user interfaces.

According to some aspects of the technology described herein, an augmented reality (AR) dashboard is provided that enables speech-activated interaction with one or more non-HMI devices that can be detected or recognized by a device. For example, using a wearable device, a user can interact with one or more non-HMI devices. An AR dashboard can utilize speech-activated bookmarks and/or applications (e.g., via natural language processing) so that a user can interact with a non-HMI device via a wearable device. A user is further able to be presented with relevant applications, content bookmarks, and/or content that are associated with the detected or recognized non-HMI device. In this way the wearable device via the AR dashboard can allow a user to efficiently navigate to and utilize relevant applications and/or content needed for a given workflow or task.

A wearable device according to some aspects of the technology described herein can include a single-sign on (SSO) module. In accordance with an SSO implementation, a user of a wearable device can activate a user profile during the initialization of the wearable device (e.g. when the device is turned on). In this manner, after the user profile is activated, all the applications, local and/or remote storage, and any other process used and/or required by the wearable device can be automatically signed into, and as such a user does not have to repeatedly provide access credentials during the use of the wearable device. During initialization of the device, the SSO module can retrieve or otherwise obtain one or more usernames and passwords that correspond to a single active profile of a user. The device initialization in some aspects can allow or enable user interaction of the wearable device, or signal to the device that data is ready to be received or obtained.

Once a wearable device is initialized, the wearable device can determine or detect a context for the device and/or user (e.g. a location can be detected and/or contextual information can be continuously received as a user moves around with the device). Based on the determined context or received contextual information, one or more bookmarks, links, applications, and/or interaction indicators that correspond to the determined context or received contextual information can be presented to a user. For example, these can be presented to a user as an AR dashboard when the wearable device is a HMD device. A user can operate the device using, for example, voice commands or any number of detectable motions. Because of the SSO authentication, when an application is launched or an electronic link or a bookmark etc. is selected or launched by a user's voice the sign-on or authentication steps can be automated based on, for example, a user's profile. Continuously received contextual information as mentioned above could, for example, be based on image recognition, detected signals, or any other indicator recognizable by the wearable device. As such, as a user of the wearable device moves around, for example changing the context of the user and/or wearable device, the AR dashboard can dynamically change to present a user with the appropriate, interrelated, applications, links, and/or bookmarks.

In another aspect according to the technology described herein, once an application, link, and/or bookmark is launched or accessed, then the only additional applications, links, and/or bookmarks displayed to a user are related to or associated with the originally launched or accessed application, link, and/or bookmark. In this way available applications, documentation, links, and the like, can be filtered or presented to a user based on a user profile, context, and/or viewing position of the wearable device, one or more commands received by the wearable device, and/or objects detected or recognized by the wearable device. In some instances, this functionality can be viewed as a virtual agent, which acts to present a user of a wearable device one or more virtual indicators and/or objects (e.g. selectable applications and/or links to other applications or content) via the AR desktop or environment based on a determined context and/or in response to one or more received commands. For example, once an application is launched or a link is selected, then only associated additional applications or links are displayed to a user. Further, by interacting with one or more virtual indicators and/or objects a user can be able receive information related to various non-HMI devices, for example non-HMI devices within a field of view of a wearable device. By using various commands associated with the virtual indicators and/or objects the wearable device can retrieve and relay information or data to a user (e.g. either from local or remote storage). In other aspects, by using various commands associated with the virtual indicators and/or objects the wearable device the user can drill down and/or navigate through a hierarchy of applications and links.

According to other aspects of the technology described herein, a head-mounted display (HMD) or head-mounted computing system can obtain sensor data corresponding to any number of HMI, non-HMI devices or objects within a field of view, for example the field of view of the HMD. In some instances, the non-HMI devices are connected to a server device, such as a remote server. The non-HMI devices can store information about themselves locally or information can be gathered on the server. In some instances, information relating to a HMI or non-HMI device can be stored remotely. In this way the HMD can "interact" with such devices, for example by requesting and receiving information from the server, where the requesting can be based on a command that references an identified or recognized HMI or non-HMI device.

In some embodiments, a server device is not needed, and an HMD device can interface directly with an HMI or non-HMI device or object, for example enabling direct communication between a machine and/or device and the HMD. The HMD can identify or recognize each non-HMI device within a field of view based on obtained or received sensor data, for example optical data. For each identified non-HMI device, one or more virtual identifiers or indicators that references or corresponds to the identified non-HMI device can be provided for display. The HMD can then receive a command associated with the virtual identifiers, and in response the HMD can provide for display or audio output information responsive to the voice command. The information associated with the non-HMI device can be received from one or more servers or remote computing devices. In some instances the information provided by the HMD can include a prompt to perform an operation that corresponds to any one of the non-HMI devices.

Additional commands can be received (including the prompt to perform the operation) to provide any additional responsive information, for example the responsive information might be an indication that virtual interaction with an identified non-HMI device is enabled or has begun, or alternatively might include diagnostic information associated with the non-HMI device. In some instances, secondary information responsive to any one of the received commands can be provided via the HMD device where the secondary information is associated with a different non-HMI device. The different non-HMI device (e.g. a second non-HMI device) can have a relationship with the initial non-HMI device (first non-HMI device). For example, the first non-HMI device and the second non-HMI could be of the same type of device (e.g. same model), or in some instances the first and second non-HMI devices can be related as part of an overall process or system. For example, the first non-HMI device can be upstream (or downstream) of the second non-HMI device where both are part of the same process. Further, the secondary information about the second non-HMI device can be provided based on the commands received or information provided with respect to the first non-HMI device. According to some aspects, the non-HMI devices can be identified by object recognition performed on obtained optical data by the HMD and based on some defined field of view. The field of view can determine the presence of the non-HMI devices or a context for an HMD device, for example based on object recognition.

FIG. 1 depicts aspects of an operating environment 100 for a content navigation system in accordance with various embodiments of the present disclosure. Operating environment 100 can include, among other components, a wearable device 120, 126, a content repository 130, a location sensor or access point 140, a user device 150, and one or more servers 160. The components can be configured to be in operable communication with one another via a network 110. The wearable device 120 includes any computing device, more particularly any head-mounted computing device (e.g. a mounted tablet, display system, smart glasses, hologram device). The wearable device 120 can include a display component 122, for example a display that can present information through visual, auditory, and/or other tactile cues (e.g., a display, a screen, a lamp, a light-emitting diode (LED), a graphical user interface (GUI), and the like). The display component can, for example, present an augmented reality (AR) view to a user, that is a live direct or indirect view of the physical real world environment supplemented by computer generated sensory input. In some aspects, image data can be generated by an optical device and displayed. In some embodiments, the wearable device 120 can have an imaging or optical input component 124. The network 110 can be further connected, via the network, to one or more local or remote servers 160 or computing systems 162.

Figure 2:
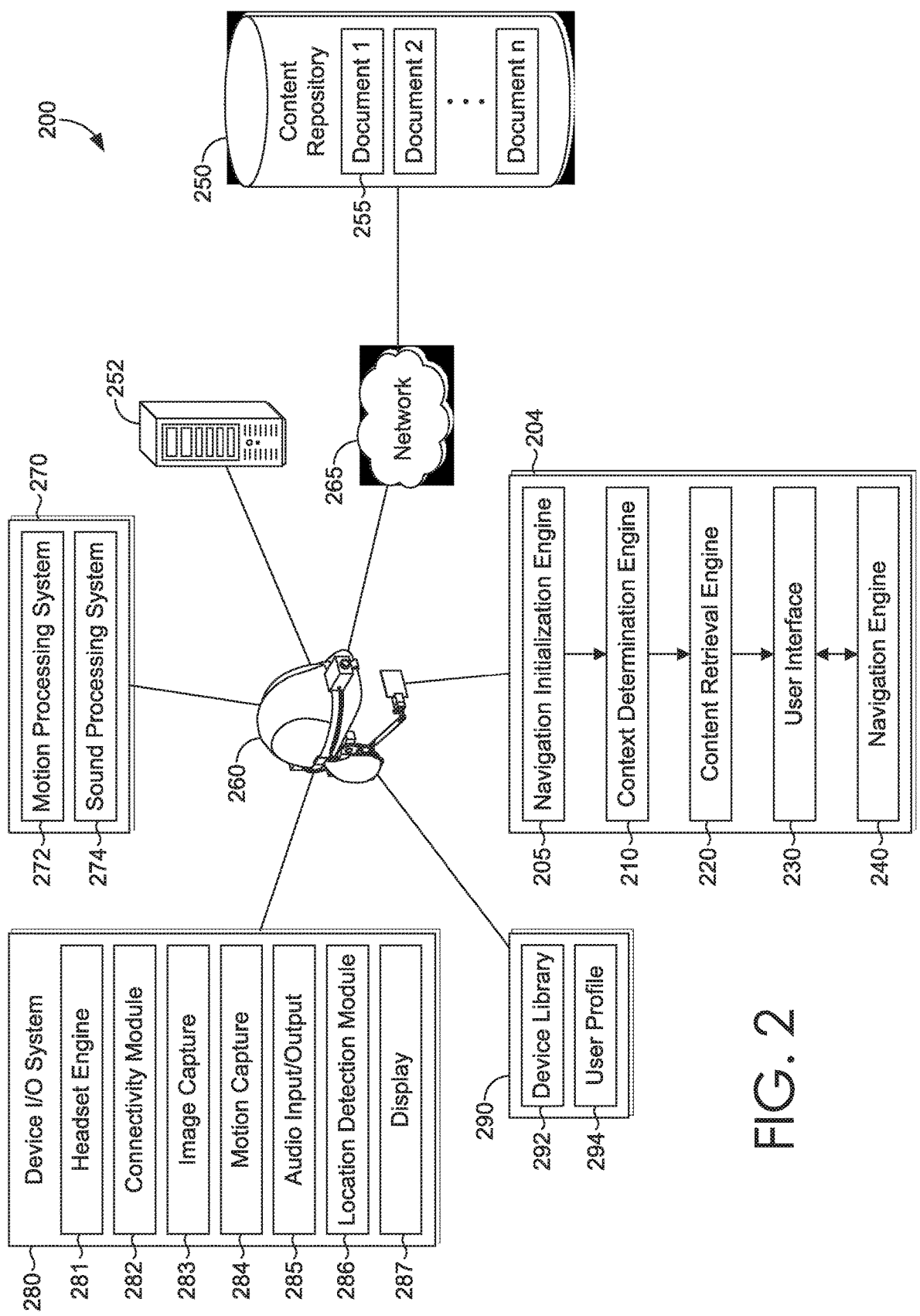

FIG. 2 depicts aspects of a content navigation system 200 used in conjunction with a wearable device (e.g. 120 of FIG. 1) in accordance with various embodiments of the present disclosure. The content navigation system 200 can include a plurality of engines or modules that make up a content navigation stack 204, including but not limited to: a navigation initialization engine 205, a context determination engine 210, a content retrieval engine 220, a navigation engine 240, and a user interface 230. As depicted, the content navigation system 200 comprises a content repository 250, which can also be a plurality of content repositories that are in operable communication with any of the engines or modules. A content repository can be a local or remote storage device or database configured to contain or host a plurality of content 255, for example document files or video files or both. It will be appreciated that in some embodiments, content can also comprise a digital feed or streaming content. The content navigation system 200 can obtain input from a user (e.g., via a user interface) or, alternatively, be obtained from another external system or engine via an interface (e.g. user device 108 of FIG. 1).

The initialization engine 205 is generally responsible for facilitating communication between the user interface, a motion processing system, a sound processing system, storage, device input/output, and their respective subcomponents. The initialization engine 205 can initialize the wearable device 260 in response to receiving a signal from the wearable device I/O system 280. For example, a physical input element (such as a button, switch, or the like) can be depressed signaling that the interaction mode should start running. The device I/O system can have a plurality of modules and engines for receiving and processing input, such as commands. As such the device I/O system can allow the wearable device 260 to interact with the system. The device I/O system modules and engines can include, but is not limited to, a headset engine 281, a connectivity module 282, an image capture module 283, a motion capture module 284, an audio input/output module, a location detection module 286, and a display 287. In operable communication with the device I/O system can be one or more processing systems 270, including but not limited to a motion processing system 272 and a sound processing system 274, which can process motion and sound received in any way by the wearable device 260. As part of the initialization sequence, one or more pieces of content 255 (e.g. document files, video files) from the content repository can be loaded onto the wearable device and stored in the device library 292. Content can be loaded onto the wearable device 260 via any known data push or pull technology.

In some embodiments, content is loaded onto the device based on some user data associated with a user profile 294. The device library 292 and the user profile 294 can be part of a local device storage 290. Further, in other embodiments, content loaded onto the wearable device 260 (e.g. onto the local device storage 290) can be subsequently associated with a user profile 294. In this way, for example, if the same user initializes the device, previously loaded or used content associated with the particular wearable device and/or user profile will be reloaded or reinitialized along with the wearable device 260. It will be appreciated that as long as the wearable device 260 is connected to a network 265, the wearable device is in operable communication with the content repository 250 and any other local or remote servers or computing systems 252, e.g. while the wearable device is in use a remote operator can push content to the wearable device 260 for the user. Alternatively, in some embodiments, a user operating the wearable device 260 can connect with any other local or remote servers or computing systems 252 through the headset I/O system 280, e.g. a user of a wearable device 260 can connect with an operator via streaming content.

Once the wearable device 260 is initialized, a context determination engine 210 can determine a context for the device and/or user or both. The context for the device can be based on any number of contextual identifiers, including location information and orientation information (i.e. direction in three-dimensional space r, θ, φ).

Context, in reference to the wearable device and/or user can be determined by any number of location indicators including, but not limited to: bar codes, quick response (QR) codes, Bluetooth beacons, visual machine recognition, visual object recognition, global positioning system (GPS), radio frequency identification (RFID), near field communication (NFC), Wi-Fi, or any other known radio-based identifiers, visually-based identifiers, or inertia-based identifiers, such as accelerometers or gyroscopes incorporated into a device. A location indicator (i.e. 140 of FIG. 1 as a sensor/transmitter) utilizing any one of the above technologies can in some embodiments pair with the wearable device 260 and via the context determination engine 210, determine a context for the wearable device 260 and/or user in any given instance of an initialized session.

It will be appreciated that an internal sensor on the wearable device can directly come into operable communication with any of the location indicators above, or alternatively a user can have another device or scanner to scan the bar code or QR code, recognize the beacon, sense the RFID tag etc. (i.e. 150 of FIG. 1) which can activate the location indicator and the wearable device (e.g. by the location detection module 286 of FIG. 2) and connect them. In some embodiments in accordance with the present disclosure, context can also be based on a user role (e.g. derived from user profile 294) or a time (e.g. time of day).

A content retrieval engine 220 can retrieve relevant content for display to a user based on the determined context (e.g. via a display 122 of FIG. 1). In various embodiments, content in the content repository 250 and the device library 292 can be associated with one or more digital tags which can be embedded as metadata within the document; in other words context is encoded into a digital tag and associated with one or more pieces of content or one or more portions of a piece of content. Each digital tag can also be associated with one or more contexts that can be determined by the context determination engine 210 for the wearable device 260. Thus, a digital tag can be associated with a piece of content and one or more contexts. In operation, after the wearable device 260 is initialized and loaded with one or more tagged pieces of content, the content retrieval engine 220 can present one or more pieces of relevant or suggested content based on the determined context via a user interface 230. In this way the content retrieval engine 220 can filter the content initially loaded onto the device. In some embodiments, if the wearable device 260 is connected to the network 265 content stored in the content repository 250 can be accessed.

Once the context based content is presented to a user, a navigation engine 240 can receive a command (e.g. a voice command) from a user to perform an action corresponding to a particular digital tag presented and available to a user on the display of the wearable device 260. For example, in one aspect a particular digital tag can allow a user to open a document associated with it. In another embodiment, a particular digital tag can allow a user to navigate to a specific page within a document, to a specific zoom level on a page within a document, to a specific XY coordinate on a page within a document, or a combination of any of the foregoing. As such, a document can have at least a second digital tag associated with it to drive the navigation through the document. It is to be understood that a given piece of content (or document in this example) can have any number of digital tags associated with it. Commands received by the wearable device 260 enable a user to navigate into and out of a specific document, as well as to any particular area within the document via the navigation engine 240. Based on the received commands, a user is presented with any portion of content via the user interface 230 without having to navigate through one or more file trees, for example. In operation the user interface 230 and the navigation engine 240 can work in tandem to navigate through the content and present the desired content to a user, by receiving commands selecting a digital tag and presenting the content or portions of content associated with that digital tag.

Figure 3C:
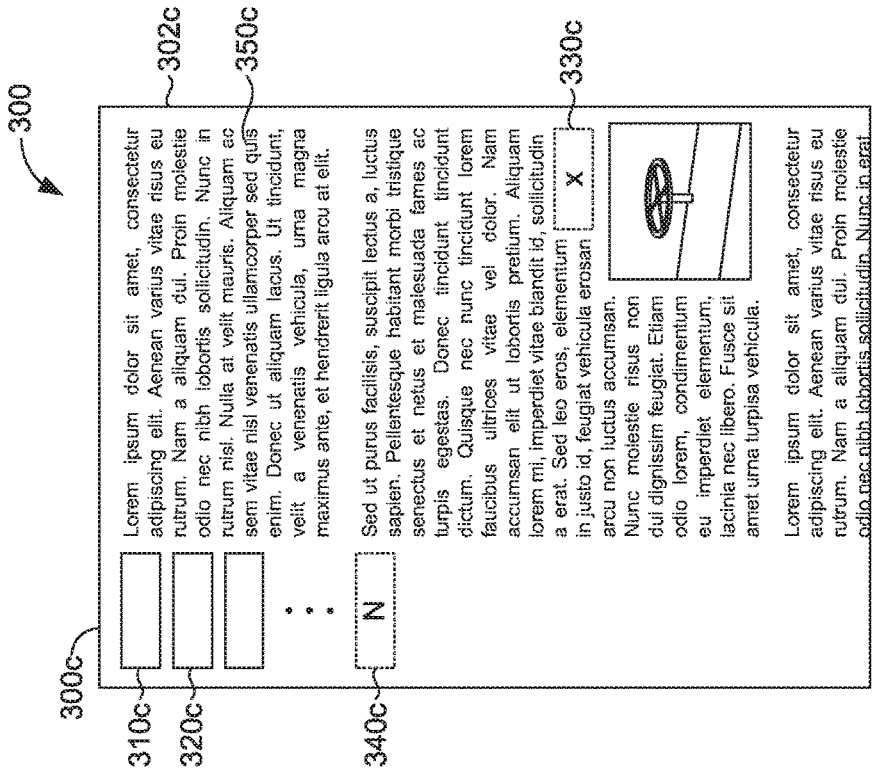
FIGS. 3A-3C provide a screen display showing a series of example user interface presentations for content navigation, in accordance with some implementations of the present disclosure.
Figure 3A:
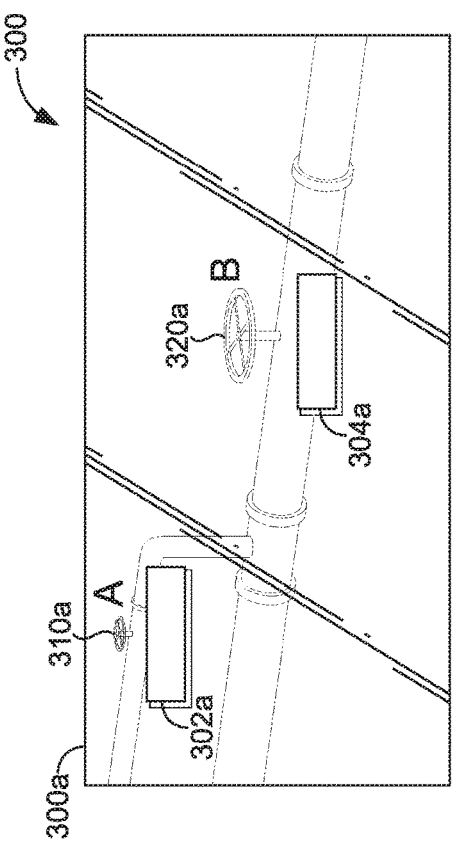

Looking now to FIG. 3A, a screen display showing an example user interface 300a showing a presentation radar to a user for content navigation is depicted. The context determination engine (e.g. 210 of FIG. 2) can determine that multiple contexts exist within the view (e.g. display 122 of FIG. 1) of a wearable device, in this case a first context 310a and a second context 320a is presented. A first dashboard indicator 302a and a second dashboard indicator 304a are presented to a user via the user interface (e.g. 230 of FIG. 2) indicating that content is available for each of physical units A and B being viewed through the display as well as available for selection by a user. A command can be received from the user to enter the content collection for either physical unit.

Figure 3B:
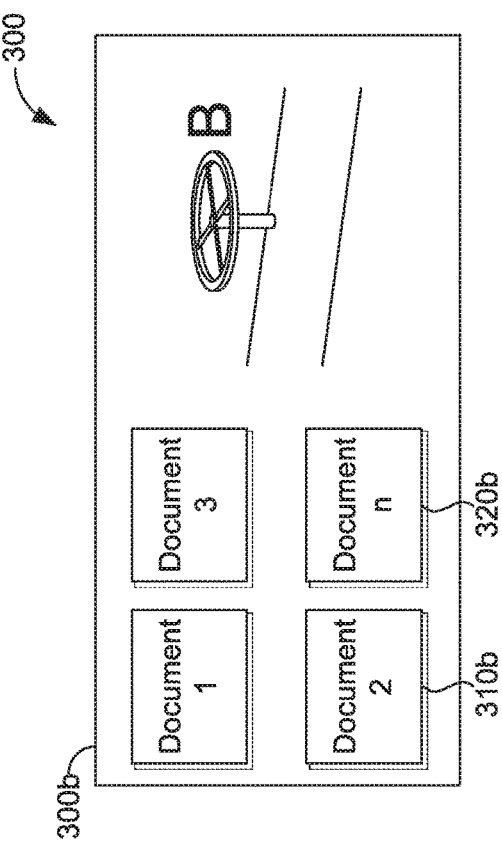

Looking now to FIG. 3B, as screen display showing an exemplary user interface 300b providing an indication that at least one document 310b, 320b is associated with physical unit B based on the determined context is depicted. At least one document 310b, 320b can be thus available for selection by a user via a received command. Although voice commands are pointed out, it is contemplated that each document (or other content) can be selected with any method known to indicate a selection. Further, although a plurality of documents are shown in the figure, it will be appreciated that the tile indicators 310b and 320b can represent any number of content (e.g. video, streaming) or applications that can be run on the wearable device. In the AR user interface context the representations or indicators on the user interface can be deep links to applications or other content, and in the display a user sees metadata representing content or packaged content that can be accessed locally or in a distributed system. In some embodiments the tiles (e.g. 310b, 320b) can represent applications that can be activated by a user through a command (e.g. voice command) that utilizes the determined context. In this way, context as used herein can be shared across content and applications that can be presented and utilized by a user of the wearable device.

Looking now to FIG. 3C a screen display showing an exemplary user interface 300c that displays a portion of content 302c is depicted. Based on a command selection in interface 300b received by the wearable device, a user can navigate to a first portion 350c of content. In some embodiments, one or more digital tags 310c, 320c associated with document 302c can be presented to the user as well via the display, and upon receiving a command from a user, the content navigation system enables a user to navigate to any portion of content associated with a digital tag. In some alternate embodiments, the digital tags are embedded in the document are not visible to a user. In this instance, a user can use voice commands to move from a first portion's associated digital tag to a second portion's associated digital tag in some logical or predetermined order. Further, it will be appreciated that a user can also manually navigate through any content without the use of digital tags, e.g. navigate to the next page of a document where there is no associated digital tag. It is to be appreciated that received commands can also allow a user to navigate into and out of screen displays 300a-300c.

Continuing with screen display 300c, at any point of interaction with the system and a piece of content, a user can add one or more digital tags 340c or one or more annotations 330c to the piece of content. Annotations can be, for example, written notations, sound bites, video bytes, or any other type of annotation that can be added to the document or content. In some embodiments, an annotation can itself be associated with a digital tag, and similarly presented to a user, for example along with digital tags 310c, 320c. Upon addition, the added digital tags or added annotations can be associated with the piece of content, associated with the wearable device, associated with the user profile, or any combination of the foregoing and stored in the local device memory. In some embodiments, annotations and digital tags can be displayed simultaneously on the content; and in some instances annotations can only be visible in certain views of a piece of contents, i.e. certain pages, certain zoom levels, certain XY coordinates on a page. In other embodiments, annotations can be shown and hidden via commands received on the wearable device from a user. When the wearable device is reconnected to a network those additions and associations can synchronize to a server or other external computing system (e.g. 252 of FIG. 2) and/or to a content repository (e.g. 250 of FIG. 2). In this way, digital tags and/or annotations can be shareable across authenticated users, devices, and organizations. Further, digital tags associated with different contexts and different pieces of content can be built up over time.

In some embodiments, a wearable device can record that an identified user viewed and/or accessed a piece of content or a specific portion of some content, the user can have viewed and/or accessed the content or portion of content via one or more digital tags or can have navigated there without the use of a digital tag. The wearable device can store the accessing and/or viewing as metadata on the device associated with the content, the user profile, the context the wearable device is in or any of the foregoing. The viewing and/or accessing can further be stored in association with the content in the content repository or on one or more servers or external computing systems. The content navigation system can thus track which pieces of content or portions of content have been accessed and/or viewed over time and monitor the history of users and devices, the contexts they have determined, and what content has been access when in that determined context. As such, it is possible that the content navigation system can suggest to a user one or more digital tags based on a determined context that other users have accessed. In some embodiments, a threshold can be set by a systems administrator such that the suggestions of digital tags in a particular context to subsequent users do not occur until the set threshold is met, different thresholds can be set for different contexts (e.g. locations) or for different user roles (e.g. tracking is only recorded by the system for some but not all user roles). In some embodiments, where a specific portion of content that does not have an associated digital tag is accessed and/or viewed enough times to meet the threshold for a given context, a content navigation system can automatically add a digital tag to that portion of content and associate the digital tag with that given context. The content navigation system can utilize thresholds and automated digital tagging at any level of granularity for a piece of content; i.e. the content navigation can consider the document, the specific page, the specific zoom level, the specific coordinates on the page or any combination of the forgoing.

Figure 4:
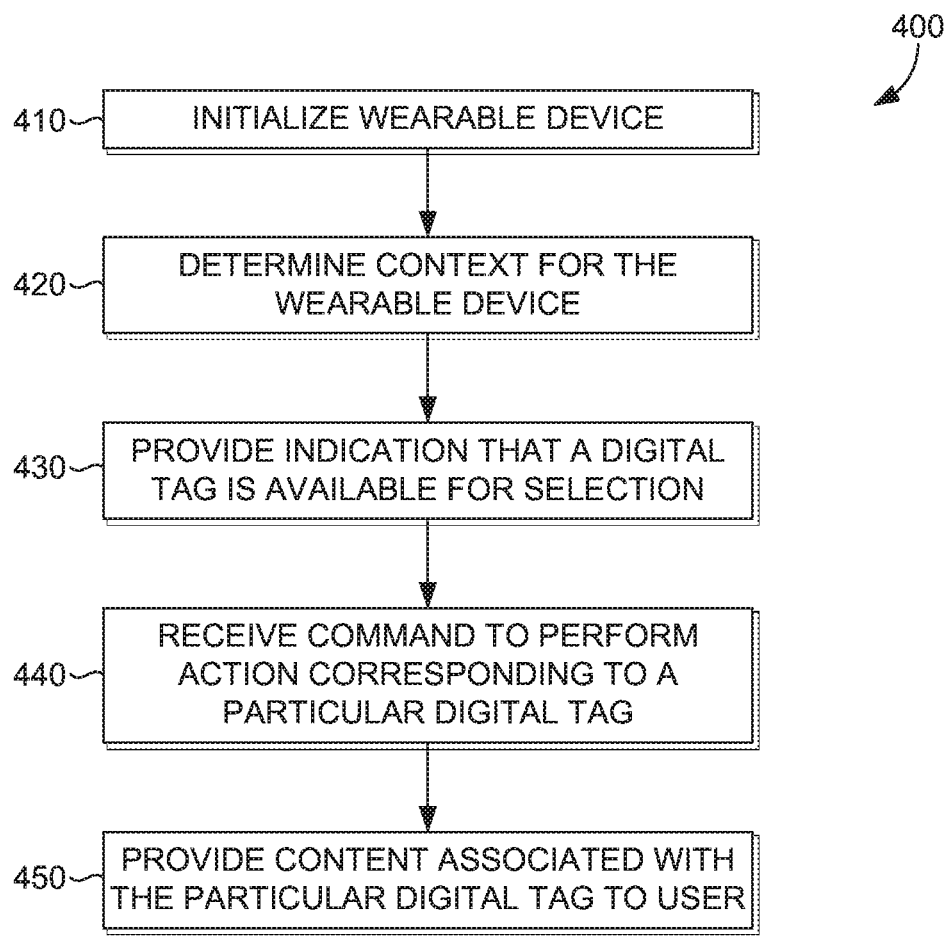

Having described various aspects of the present disclosure, exemplary methods are described below for navigating content based on context using a wearable device. Referring to FIG. 4 in light of FIGS. 1-3c, FIG. 4 is a flow diagram showing a method 400 for enabling content navigation. Each block of method 400 and other methods described herein comprises a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

At block 410, a wearable device can be initiated, for instance, by an I/O system of a content navigation system (e.g., content navigation system 200 of FIG. 2). Once initialized, one or more pieces of content (e.g. document file, video file) can be loaded into the local memory of the wearable device. Each piece of content includes one or more associated digital tags.

At block 420 a context can be determined for the wearable device. In one aspect the context can be determined through the use of a location indicator (e.g. a Bluetooth beacon), an orientation indicator (e.g. a gyroscope), or a combination of the foregoing.

At block 430, one or more indications that content is available for selection is provided to a user via a display on the wearable device. The indications represent content stored in the wearable device library associated with the determined context by at least one digital tag.

At block 440, a command is received by the content navigation system to perform an action corresponding to a particular indicator, for example, selecting a particular piece of content. At block 450, content is provided to a user via a display.

Figure 5:
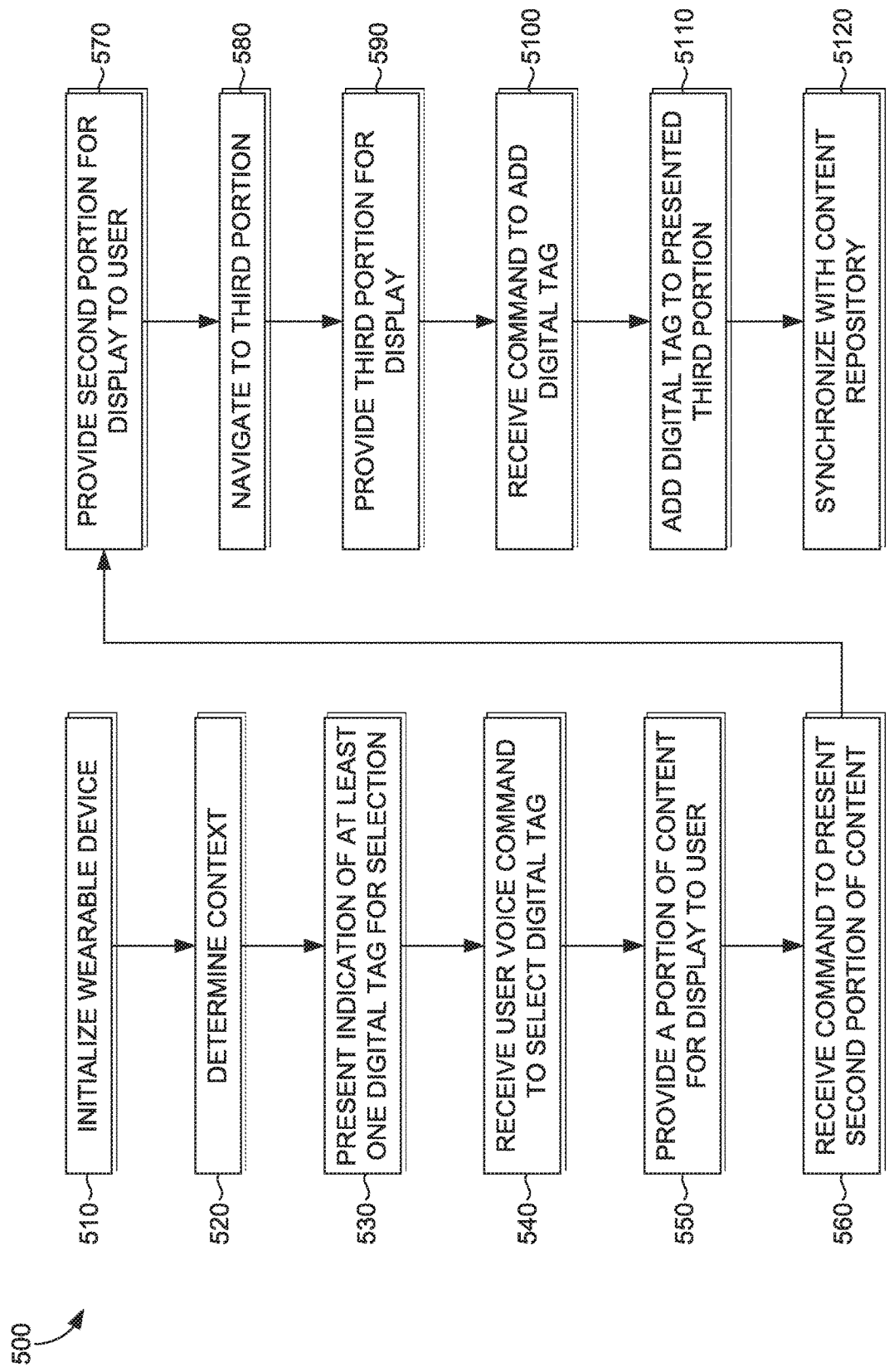

Referring to FIG. 5 in light of FIGS. 1-3c, FIG. 5 is a flow diagram showing a method 500 for enabling content navigation. At block 510, a head-mounted computing device is initialized. Upon initialization, a user of the head-mounted computing device or an administrator and/or automated server at a remote location can load one or more digital content files into the memory of the head-mounted computing, creating a library of available content for the head-mounted computing device to utilize. Each of the one or more digital content files comprise at least one digital tag, including at least one digital tag associated with a geocoded context.

At block 520, a context is determined for the head-mounted computing device is determined. The context determined can be based on a location, an orientation, a user-role, a time or any combination of the foregoing. It is to be recognized that the head-mounted computing device can continuously determine a context based on a change in any of the above determination factors. For example, a change in the location or orientation of the head-mounted computing device will cause the content navigation system to re-determine the context of the device. In some embodiments, the context is determined once either simultaneously with or after initialization of the device, and can be changed only after a command or indication is received by the device that context can be re-determined. In some embodiments, more than one contexts can be determined.

At block 530, one or more indications that content is available for selection is provided to a user via a display on the head-mounted computing device. The indications on the display can be one or more representations or indications that an underlying digital tag associated with some content can be selected based on the determined context. In some embodiments the one or more indications represent selectable digital tags themselves. In other embodiments, the indications represent a grouping of selectable digital tags can be available and associated with one or more determined contexts. For example, at specified location and orientation, a user can view within an AR display two physical units that can drive two separate contexts, indications can be provided to the user that each physical unit is associated with at least one digital tag or a grouping of digital tags that the user can select.

At block 540, voice command is received by head-mounted computing device to select a digital tag; alternatively, the head-mounted computing device can receive a command to perform an action corresponding to the digital tag. In some embodiments, a user can select any digital tag that is presented via the display, in other embodiments, a user can see an indication that there are other digital tags, but can only select one of a sub-set of the displayed digital tags.

At block 550, a first portion of content is provided for display to the user, the first portion of content associated with the selected digital tag. Within the first portion view, other associated digital tags can be presented to a user for further navigation within the content navigation system. In this way, digital tags themselves can be related to each other and connected, when a first digital tag is selected and the content or portion of content associated with the first digital tag is presented, along with the presentation of the content or portion of content can be one or more indications that other selectable digital tags are available. In some embodiments the selection of one digital tag will drive the presentation of subsequent digital tags and their availability for selection.

At block 560, a voice command to select a second digital tag is received by head-mounted computing device. At block 570, a second portion of content is provided for display to the user, the second portion of content associated with the selected second digital tag. Within the second portion view, other associated digital tags can be presented to a user for further navigation within the content navigation system.

At block 580, a command or set of commands is received by the head-mounted computing device to navigate to a third portion of content. The command or set of commands allow a user of a head-mounted computing device to navigate through digital content freely or in an ad hoc manner. At block 590, the third portion of content is provided for display to a user. If the third portion of content has any associated digital tags, indications of those digital tags can be provided for display to the user as well.

At block 5100, a command or set of commands to add a digital tag to the third portion of content is received. At block 5110 the new digital tag is added to the third portion of content, and associated with both the third portion of content and the determined context. Further, the digital tag can also be associated with a user profile At block 5120, the content with the digital tag is synchronized to the device library. When the head-mounted computing device is connected to a network the content with the added digital tag can be synchronized back to the content repository.

Figure 6:
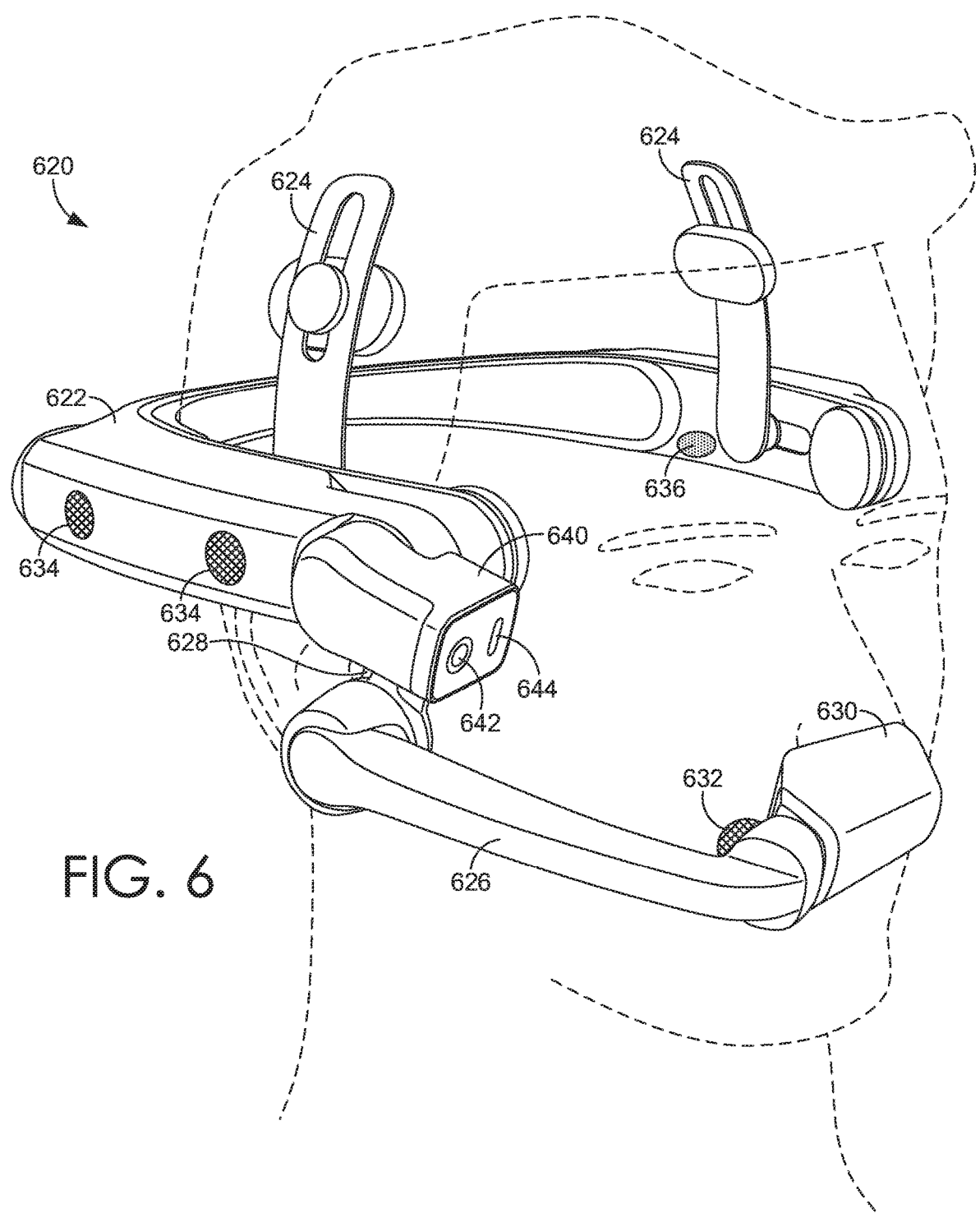

FIG. 6 shows an exemplary embodiment of a HMD device 620, in accordance with some implementations of the present disclosure. HMD device 620 is a wearable device and can include similar features to that of wearable device 1200 of FIG. 12. HMD device 620 can be similar to HMD device 120 of FIG. 1. HMD device 620 includes a frame member 622. Frame member 622 can be a frame structure. As shown in FIG. 6, frame member 622 is configured and arranged for wearing by a user. For instance, frame member 622 can be worn about the user's head. HMD device 624 can additionally include one or more stabilizing members 624 (or stabilizing structures) that stabilize the frame member 622 about the user's head.

HMD device 620 can include one or more rotating members, such as but not limited to first rotating member 626 and second rotating member 628. In some embodiments at least one rotating members 626 or 628 is rotatably coupled to frame member 622, i.e. at least one of rotating members 626 or 628 is coupled to frame member and configured and arranged for rotating relative to frame member 622. In at least one embodiment, first rotating member 626 can be a boom arm that is coupled to a display module 630. Display module 630 houses a display device (not shown in FIG. 2) that is directed towards the eyes of the users. As shown in FIG. 2, the display device is within the user's line-of-sight (LOS). In some embodiments, the user can re-position the display device, via a rotation of one or more of rotating members 626/628, such the display device is excluded from the user's LOS. Note that in the view of HMD device 620 shown in FIG. 6, the display device is occluded by external surfaces display module 630.

HMD device 620 includes various electroacoustic transducers (e.g. microphones and audio speakers). One such electroacoustic transducer 632 is located near a distal end of rotating member 626. Electroacoustic transducer 632 can be a primary microphone. In various embodiments, HMD device 620 includes one or other electroacoustic transducers, including but not limited to one or more auxiliary microphones 634 and one or more audio speakers, such as but not limited to audio speaker 636.

HMD device 620 can include an optical module 640 that houses one or more photon-detectors (e.g. camera devices), such as photon-detector 642 and a projection system 644. Projection system 644 can include one or more photon-emitters (e.g. scanning lasers, scanning light emitting diodes (LED), and the like). Optical module 640 can be configured and arranged to rotate relative to frame member 622, such that the field-of-view (FOV) of the photon-detector 642 can be rotationally varied. In at least some rotational orientations of optical module 640, the FOV of photon-detector 642 is at least similar to the FOV of the user.

Figure 7A:
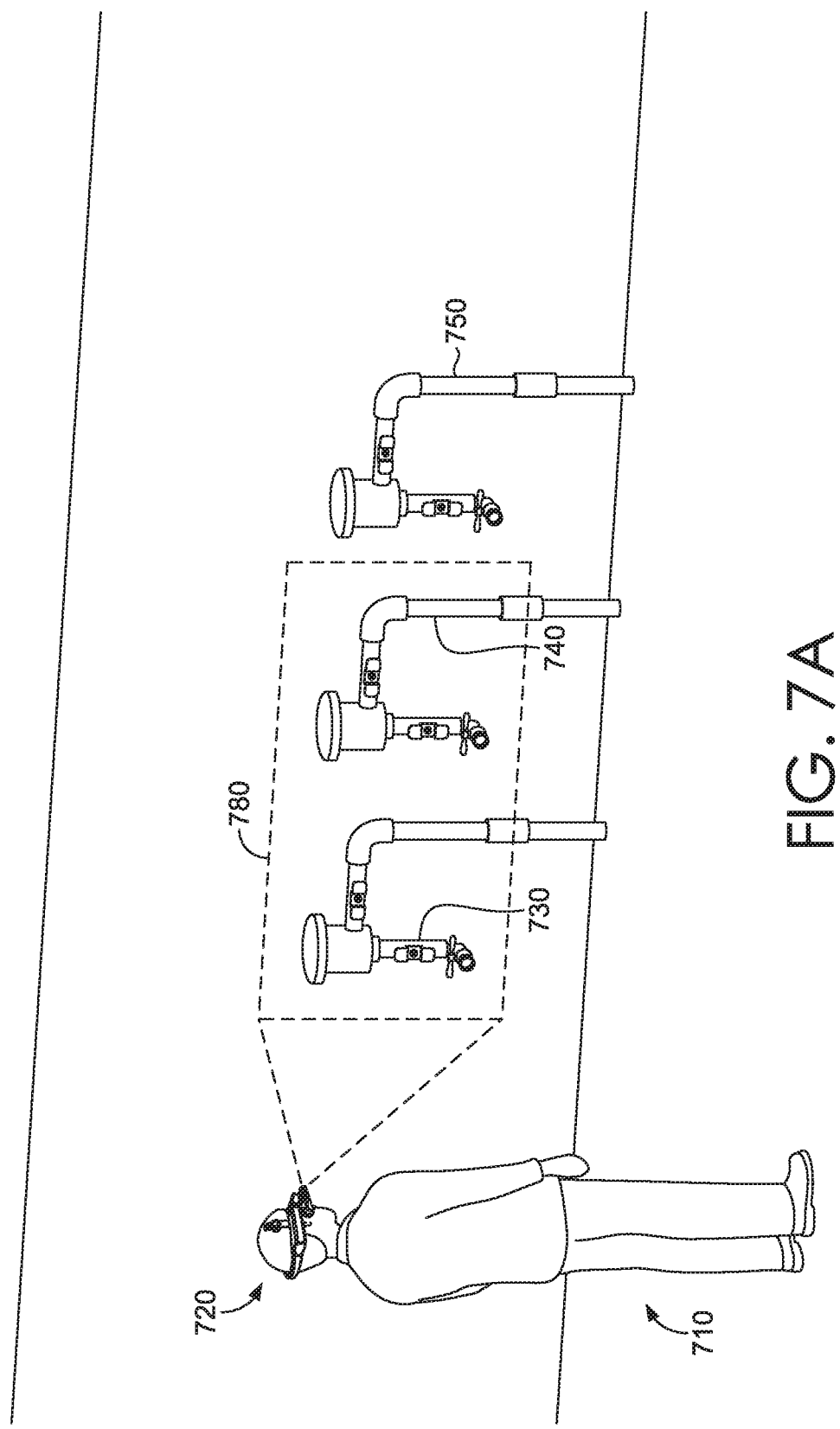
FIG. 7A shows a user employing a wearable device, in accordance with some implementations of the present disclosure.

FIG. 7A shows a user 710 employing a wearable device 720 (e.g. head-mounted display (HMD) device), in accordance with some implementations of the technology described herein. Wearable device 720 can be similar to wearable device 260 of FIG. 2, and/or HMD device of FIG.

6. Returning to FIG. 7A, an optical module (e.g. 640 of FIG. 6 and/or image capture module 283 of FIG. 2) of wearable device 720 can receive and generate image data for a field-of-view (FOV) 780 of the wearable device's optical module. In various embodiments, one or more non-HMI devices 730, 740, 750 can exist within the FOV of the wearable device 720. While reference is made to one or more non-HMI devices, it is contemplated by the present disclosure that any aspect of the technology described herein can be equally applicable to HMI devices. It will be appreciated that the HMD devices or wearable devices described herein enable interfacing with one or more objects or machines, those objects and machines may or may not be integrated with computer and/or interface components. The wearable device 720 can recognize the one or more non-HMI devices 730, 740, 750 as they come into view of the wearable device as a user looks around. Image data for the non-HMI devices 730, 740, 750 can be generated by the optical module and encode the FOV 780 of the wearable device (i.e. FOV of the optical module). The optical module can also operate in conjunction with a context determination engine (e.g. 210 of FIG. 2) in order to determine a context for the device and/or user or both. The context for the device can be based on any number of contextual identifiers, including location information and orientation information (i.e. direction in three-dimensional space r, θ, φ). In some aspects, the wearable device 720 via the context determination engine and/or the optical module can detect a viewing location (e.g. position) and/or an orientation (e.g. field-of-view).

Figure 7B:
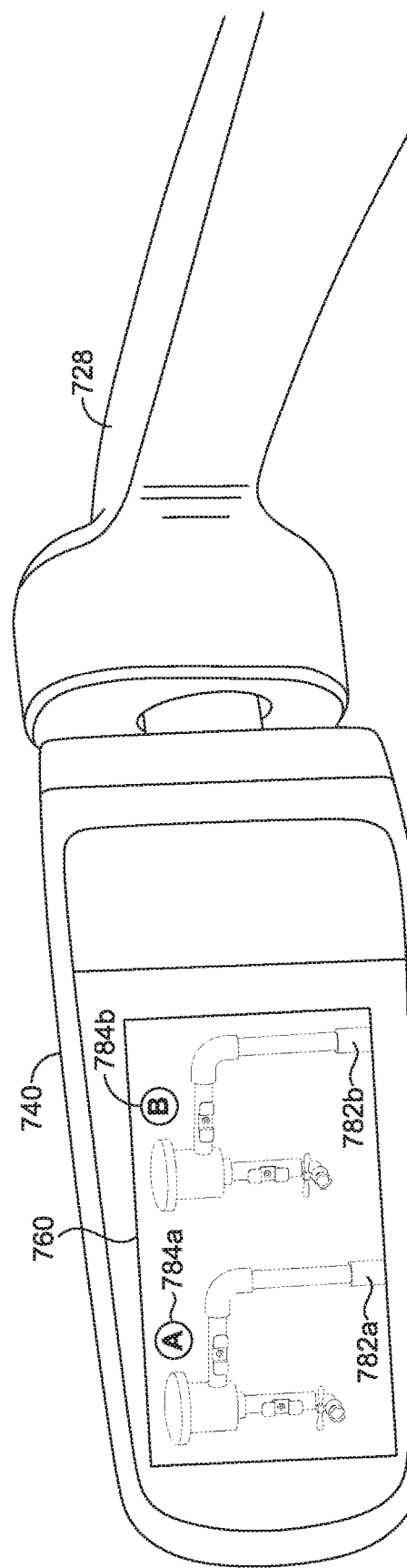
FIG. 7B shows an exemplary display of a wearable device, in accordance with some implementations of the present disclosure.

FIG. 7B shows a display device 760 of the wearable device 720, displaying image data 782*a*, 782*b* (corresponding to non-HMI devices within the FOV of the wearable device) and virtual indicators and/or objects 784*a*, 784*b*, in accordance with some implementations of the technology provided herein. Collectively, display device 760 can provide an integrated augmented reality (AR) dashboard. Display device 760 can be housed in display module 740 of the wearable device 720. As shown in FIG. 7B, display device 760 shows image data 782*a*, 782*b* generated for a FOV generated in FIG. 7A along with virtual indicators and/or objects 784*a*, 784*b*, for example generated by the context determination engine of the wearable device (e.g. 210 of FIG. 2). In various aspects, displayed image data 782*a*, 782*b* encodes the FOV of the optical module of the wearable device. Further, the virtual indicators and/or objects can correspond to the image data, generated through the recognition of one or more non-HMI devices detected or recognized by the wearable device (e.g. through the optical module). The virtual indicators and/or objects can further be associated with one or more commands. One or more commands can then be received by the wearable device (e.g. one or more voice commands) so that a user can interact with the AR dashboard. Utilizing one or more commands a user can select and/or interact with the virtual indicators and/or objects, for example to retrieve information associated with the image data (e.g. pulled from local or remote storage), launch one or more applications, and/or present the user with one or more selectable links. In some aspects, the links can correspond to bookmarks and/or content as previously described herein.

In some embodiments, a user can interact with one or more non-HMI devices (e.g. 730, 740, 750 of FIG. 7A) via the AR environment (e.g. display 760 of FIG. 7B) based on contextual information determined by the wearable device 720 by utilizing voice commands. Voice commands can be received and interpreted by the wearable device 720 through natural language processing (e.g. via sound processing system 274 of FIG. 2). For example, a user can select, via one or more commands (e.g. voice command), virtual indicator "A" 784*a*, and the wearable device can detect and recognize the command so that the user can then interact with the virtual object associated with the image data. For example, if a user is standing in front of three different non-HMI devices (e.g. 730, 740, 750 of FIG. 7A), based on where the wearable device is directed any number of non-HMI devices can be presented to a user as image data as it is interpreted via the FOV. Each image data corresponding to a non-HMI device can have a separate virtual indicator and/or object associated with the interpreted image data displayed. A user can then utilize one or more commands to, for example, select one of the virtual objects and/or indicators. When the command and thus the indicator and/or object is recognized by the wearable device an application associated with the image data can launch (authenticating with the user's profile) or one or more associated additional links (or indicators or objects) can be presented to a user. For instance, there can be different applications/links/objects associated with the corresponding non-HMI device, such as inspecting or servicing the object, finding other objects (i.e. indicating downstream processes and workflows) and/or viewing data associated with the corresponding non-HMI devices.

Figure 7C:
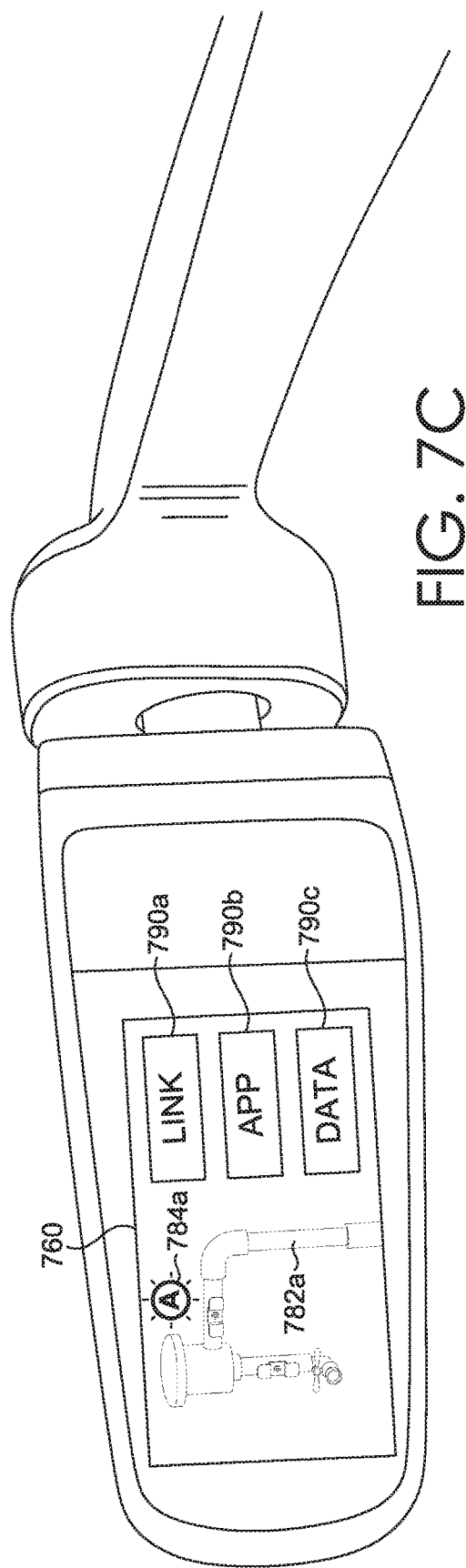
FIG. 7C shows an exemplary display of a wearable device, in accordance with some implementations of the present disclosure.

Referring now to FIG. 7C, a user can be presented, via the display device 760, with an interactive view of virtual indicator 784*a* corresponding to generated image data 782*a*. The interactive view (e.g. integrated AR dashboard) can include one or more virtual objects, applications and/or bookmarks relating to the image data corresponding to the one or more non-HMI devices (e.g. 790*a*, 790*b*, 790*c* of FIG. 7C). The applications and/or bookmarks can be provided via local and/or remote storage. In some embodiments, information previously stored on the wearable device, a document stored in a content repository (e.g. 250 of FIG. 2), or information provided by a remote user (e.g. 162 of FIG. 1) can be queried. For example, a user can query any operational and/or stored data for a non-HMI device that has been previously stored. Further, a user can launch an application relating to the image data which can provide an operational workflow and/or procedure, or further can launch one or more bookmarks (as previously described herein) relating to the image data 782*a*.

Figure 8:
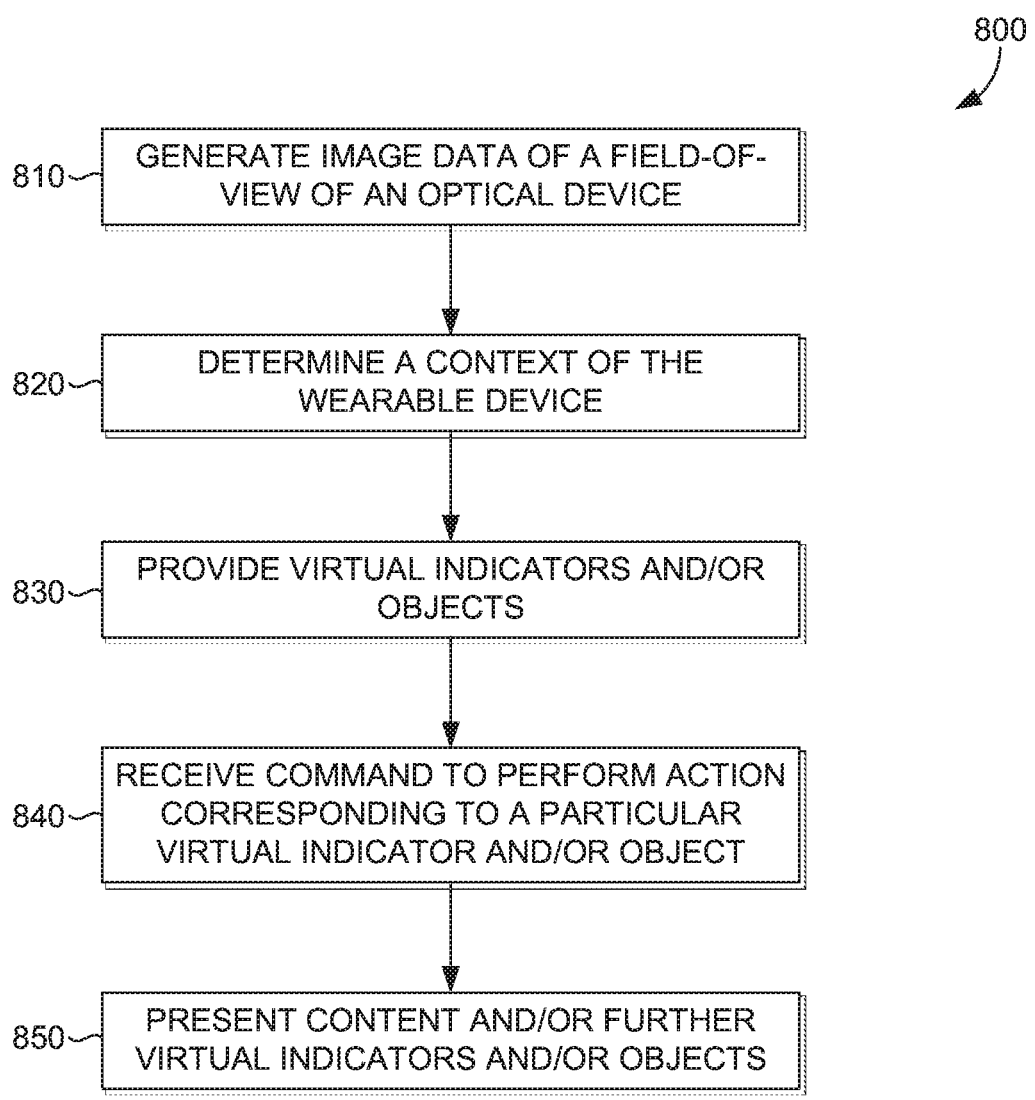

Referring now to FIG. 8, an illustrative process flow depicting a method for hands-free object interaction, in accordance with some implementations of the present disclosure is provided. At block 810, image data is generated of a field-of-view (FOV) of an optical module (e.g. a camera) incorporated in a wearable device. For example, a camera incorporated in wearable device 120, 126 of FIG. 1 can generate image data that encodes the FOV of the camera (i.e. image data corresponding to one or more non-HMI devices detected by the wearable device). The wearable device can be a HMD device, such as HMD device 620 of FIG. 6. At block 820, a context for the wearable device is determined. For example, a context can be determined based on a location or orientation, or any other received contextual information (e.g. a scanned QR code or data received via wireless connection). Based on the image data and determined context, at block 830, one or more virtual indicators and/or objects are presented to a user. The virtual indicators and/or objects can be a launchable application, selectable link, or visual presentation of data. At block 840 the wearable device receives a command to perform one or more actions corresponding to a particular virtual indicator and/or object. For example, a command to present visual and/or audio data to a user, launch an application, or provide content to a user through a link. Further, a command can cause the wearable device to present a subset of virtual indicators and/or objects to a user based on the initial virtual indicator and/or object. After receiving one or more commands (e.g. voice command(s)), at block 850 visual and/or audio data can be presented to a user, an application can be launched, and/or content can be provided to a user through a selected link. In some embodiments, further virtual indicators and/or objects can be presented to a user based on the initial virtual indicator and/or object.

Figure 8B:
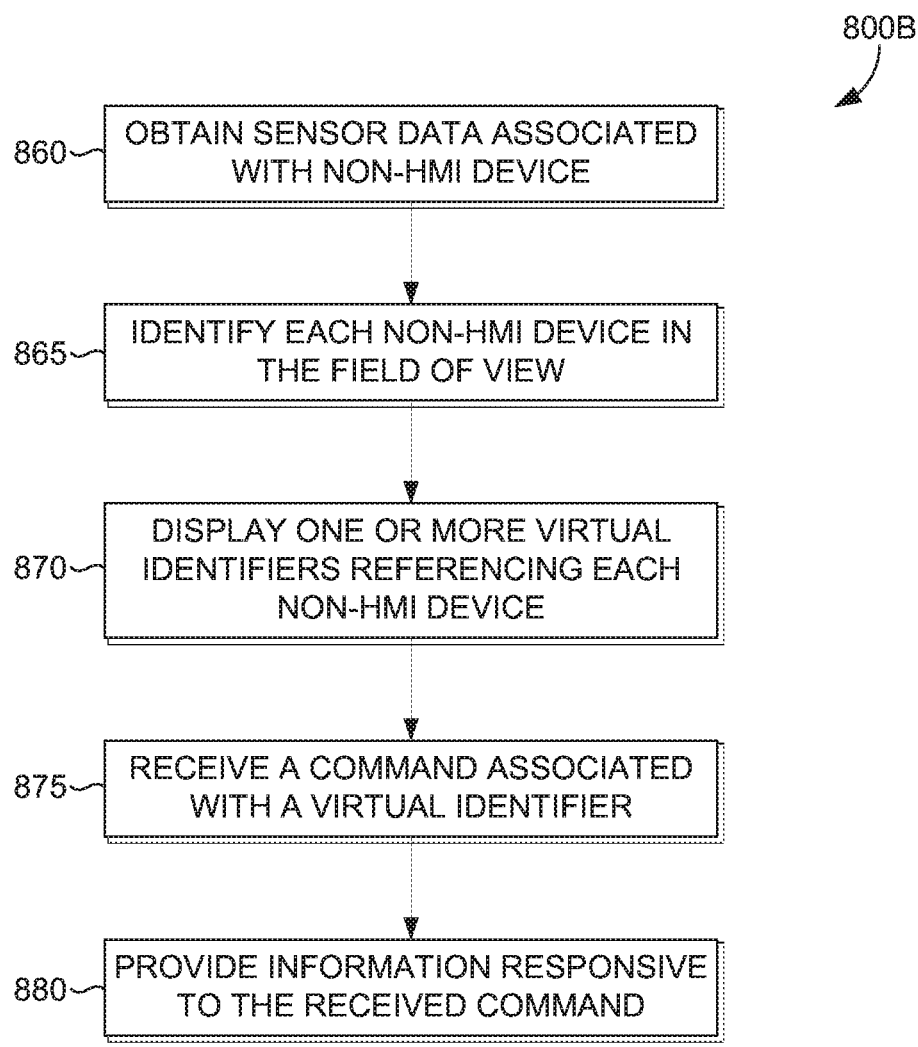
FIG. 8B provides an illustrative process flow depicting a method for virtual interaction with non-human-machine interface devices, in accordance with some implementations of the present disclosure.

Referring now to FIG. 8B, an illustrative process flow 800B depicting a method for virtual interaction with non-HMI devices in accordance with some implementations of the present disclosure is provided. At block 860, sensor data associated with one or more non-HMI devices is obtained by a wearable device, such as an HMD device (e.g. 620 of FIG. 6). The HMD can obtain data for any non-HMI device within a field of view of an optical input device coupled to, or incorporated into, the HMD. In some instances, each of the non-HMI devices is in operable communication a server device via a network. At block 865, the HMD can identify, or recognize, each non-HMI device that is within the field of view based on the sensor data. In various embodiments, the sensor data can include one or more of optical data, wireless data, GPS data, HMD device orientation data, and HMD device position data. At block 870, a virtual identifier that references each identified non-HMI device can be provided for display. For example, virtual indicator 784a, 784b of FIG. 7B. A virtual indicator or identifier can be displayed for any non-HMI device that is within the field of view. The virtual indicators can be displayed in any logical way that can indicate an association with a device. When at least one identified non-HMI device is within the field of view, at step 875 a voice command can be received by the HMD. The voice command can be associated with the virtual identifier that is associated with, or references, the non-HMI device. In some instances, a list of commands for a user to employ can be presented on the display device (e.g. 760 of FIG. 7B). In other instances, a voice command can be utilized such that the HMD audibly provides command options to a user. At step 880, the HMD can provide, either via display or audio output, information in response to the received voice command. The responsive information can be associated with the identified non-HMI device. In some embodiments, the responsive information is retrieved by the HMD from a server device based on the voice command. In other embodiments the HMD can be in direct communication with the device (e.g. non-HMI device) and obtains responsive information stored on the device itself, e.g. in a device memory or cache.

Having described embodiments of the present invention, an example operating environment in which embodiments of the present invention can be implemented is described below in order to provide a general context for various aspects of the present invention.

Figure 9:
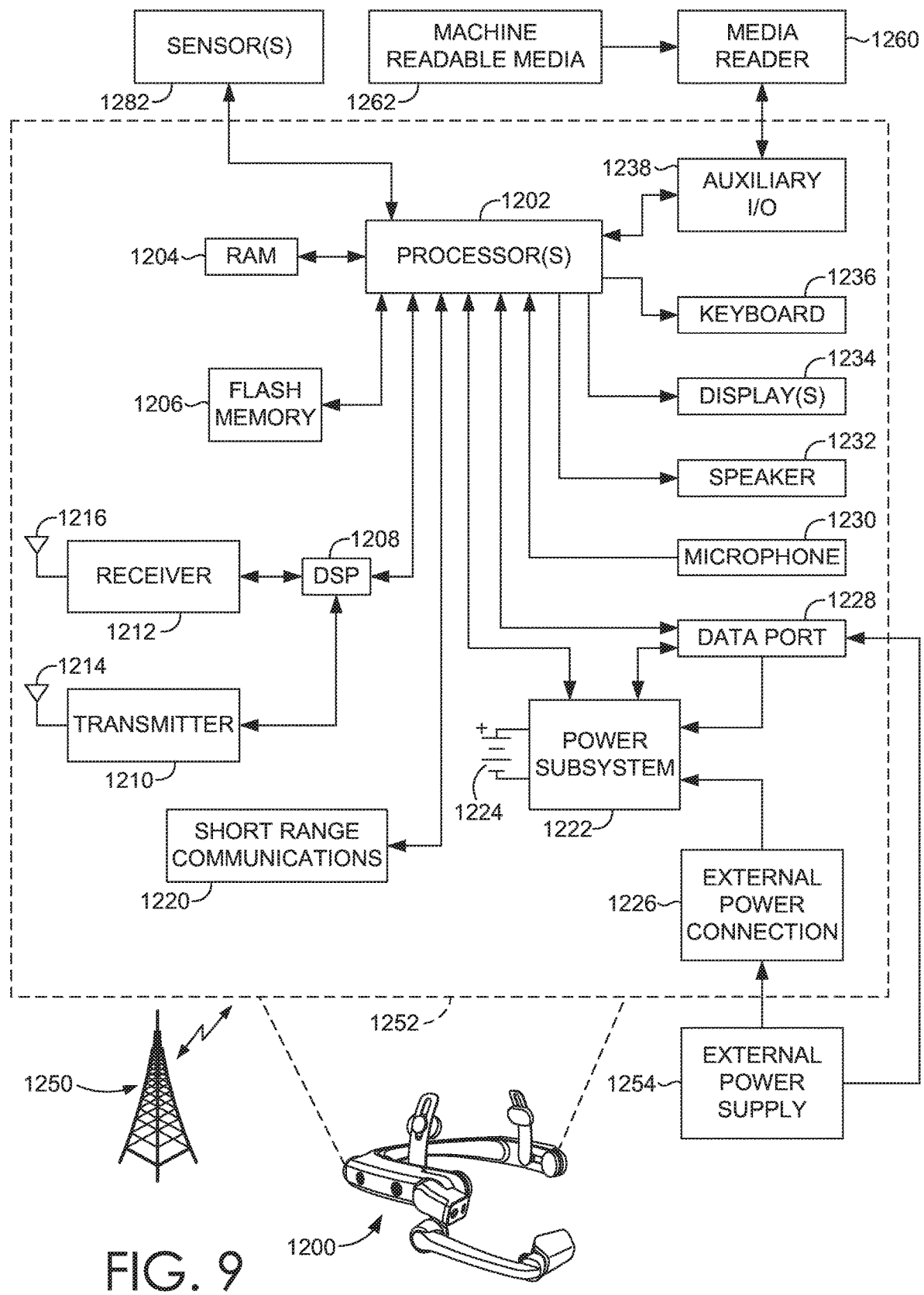

Referring to FIG. 9, a block diagram of an exemplary wearable device 1200 in which some implementations of the present disclosure can be employed is provided. Any of the various embodiments of wearable devices discussed herein, including but not limited to HMD device 120, 126, 260 or 620 of FIGS. 1, 2, and 6 respectively, can include similar features, components, modules, operations, and the like as wearable device 1200. In this example, wearable device 1200 can be enabled for wireless two-way communication device with voice and data communication capabilities. Such wearable devices communicate with a wireless voice or data network 1250 using a suitable wireless communications protocol. Wireless voice communications are performed using either an analog or digital wireless communication channel. Data communications allow the wearable device 1200 to communicate with other computer systems via the Internet. Examples of wearable devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated wearable device 1200 is an exemplary wearable device that includes two-way wireless communications functions. Such wearable devices incorporate communication subsystem elements such as a wireless transmitter 1210, a wireless receiver 1212, and associated components such as one or more antenna elements 1214 and 1216. A digital signal processor (DSP) 1208 performs processing to extract data from received wireless signals and to generate signals to be transmitted. The particular design of the communication subsystem is dependent upon the communication network and associated wireless communications protocols with which the device is intended to operate.

The wearable device 1200 includes a microprocessor 1202 that controls the overall operation of the wearable device 1200. The microprocessor 1202 interacts with the above described communications subsystem elements and also interacts with other device subsystems such as flash memory 1206, random access memory (RAM) 1204, auxiliary input/output (I/O) device 1238, data port 1228, display 1234, keyboard 1236, speaker 1232, microphone 1230, a short-range communications subsystem 1220, a power subsystem 1222, and any other device subsystems.

A battery 1224 is connected to a power subsystem 1222 to provide power to the circuits of the wearable device 1200. The power subsystem 1222 includes power distribution circuitry for providing power to the wearable device 1200 and also contains battery charging circuitry to manage recharging the battery 1224. The power subsystem 1222 includes a battery monitoring circuit that is operable to provide a status of one or more battery status indicators, such as remaining capacity, temperature, voltage, electrical current consumption, and the like, to various components of the wearable device 1200.

The data port 1228 is able to support data communications between the wearable device 1200 and other devices through various modes of data communications, such as high speed data transfers over an optical communications circuits or over electrical data communications circuits such as a USB connection incorporated into the data port 1228 of some examples. Data port 1228 is able to support communications with, for example, an external computer or other device.

Data communication through data port 1228 enables a user to set preferences through the external device or through a software application and extends the capabilities of the device by enabling information or software exchange through direct connections between the wearable device 1200 and external data sources rather than via a wireless data communication network. In addition to data communication, the data port 1228 provides power to the power subsystem 1222 to charge the battery 1224 or to supply power to the electronic circuits, such as microprocessor 1202, of the wearable device 1200.

Operating system software used by the microprocessor 1202 is stored in flash memory 1206. Further examples are able to use a battery backed-up RAM or other non-volatile storage data elements to store operating systems, other executable programs, or both. The operating system software, device application software, or parts thereof, are able to be temporarily loaded into volatile data storage such as RAM 1204. Data received via wireless communication signals or through wired communications are also able to be stored to RAM 1204.

The microprocessor 1202, in addition to its operating system functions, is able to execute software applications on the wearable device 1200. A predetermined set of applications that control basic device operations, including at least data and voice communication applications, is able to be installed on the wearable device 1200 during manufacture. Examples of applications that are able to be loaded onto the device can be a personal information manager (PIM) application having the ability to organize and manage data items relating to the device user, such as, but not limited to, e-mail, calendar events, voice mails, appointments, and task items.

Further applications can also be loaded onto the wearable device 1200 through, for example, the wireless network 1250, an auxiliary I/O device 1238, Data port 1228, short-range communications subsystem 1220, or any combination of these interfaces. Such applications are then able to be installed by a user in the RAM 1204 or a non-volatile store for execution by the microprocessor 1202.

In a data communication mode, a received signal such as a text message or web page download is processed by the communication subsystem, including wireless receiver 1212 and wireless transmitter 1210, and communicated data is provided to the microprocessor 1202, which is able to further process the received data for output to the display 1234, or alternatively, to an auxiliary I/O device 1238 or the data port 1228. A user of the wearable device 1200 can also compose data items, such as e-mail messages, using the keyboard 1236, which is able to include a complete alphanumeric keyboard or a telephone-type keypad, in conjunction with the display 1234 and possibly an auxiliary I/O device 1238. Such composed items are then able to be transmitted over a communication network through the communication subsystem.

For voice communications, overall operation of the wearable device 1200 is substantially similar, except that received signals are generally provided to a speaker 1232 and signals for transmission are generally produced by a microphone 1230. Alternative voice or audio I/O subsystems, such as a voice message recording subsystem, can also be implemented on the wearable device 1200. Although voice or audio signal output is generally accomplished primarily through the speaker 1232, the display 1234 can also be used to provide an indication of the identity of a calling party, the duration of a voice call, or other voice call related information, for example.

Depending on conditions or statuses of the wearable device 1200, one or more particular functions associated with a subsystem circuit can be disabled, or an entire subsystem circuit can be disabled. For example, if the battery temperature is low, then voice functions can be disabled, but data communications, such as e-mail, can still be enabled over the communication subsystem.

A short-range communications subsystem 1220 provides for data communication between the wearable device 1200 and different systems or devices, which need not necessarily be similar devices. For example, the short-range communications subsystem 1220 includes an infrared device and associated circuits and components or a Radio Frequency based communication module such as one supporting Bluetooth® communications, to provide for communication with similarly-enabled systems and devices, including the data file transfer communications described above.

A media reader 1260 connectable to an auxiliary I/O device 1238 to allow, for example, loading computer readable program code of a computer program product into the wearable device 1200 for storage into flash memory 1206. One example of a media reader 1260 is an optical drive such as a CD/DVD drive, which can be used to store data to and read data from a computer readable medium or storage product such as computer readable storage media 1262. Examples of suitable computer readable storage media include optical storage media such as a CD or DVD, magnetic media, or any other suitable data storage device. Media reader 1260 is alternatively able to be connected to the wearable device through the data port 1228 or computer readable program code is alternatively able to be provided to the wearable device 1200 through the wireless network 1250.

Figure 10:
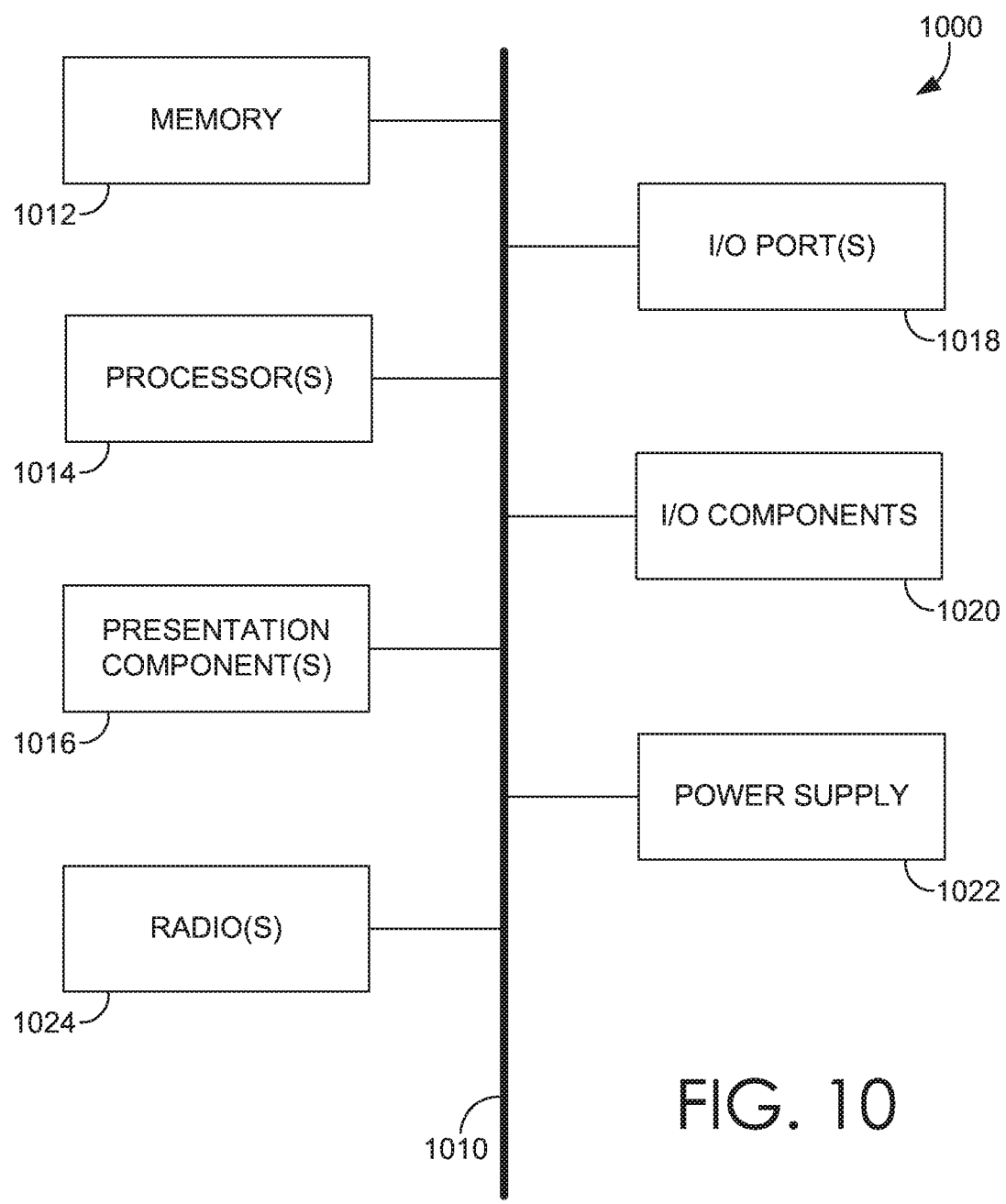

FIG. 10 provides an illustrative operating environment for implementing embodiments of the present invention is shown and designated generally as computing device 1000. Computing device 1000 is merely one example of a suitable computing environment and is not intended to suggest any limitation as to the scope of use or functionality of the invention. Neither should the computing device 1000 be interpreted as having any dependency or requirement relating to any one or combination of components illustrated.

Embodiments of the invention can be described in the general context of computer code or machine-useable instructions, including computer-executable instructions such as program modules, being executed by a computer or other machine, such as a smartphone or other handheld device. Generally, program modules, or engines, including routines, programs, objects, components, data structures etc., refer to code that perform particular tasks or implement particular abstract data types. Embodiments of the invention can be practiced in a variety of system configurations, including hand-held devices, consumer electronics, general-purpose computers, more specialized computing devices, etc. Embodiments of the invention can also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output ports 1018, input/output components 1020, and an illustrative power supply 1022. Bus 1010 represents what can be one or more busses (such as an address bus, data bus or combination thereof). Although the various blocks of FIG. 10 are shown with clearly delineated lines for the sake of clarity, in reality, such delineations are not so clear and these lines can overlap. For example, one can consider a presentation component such as a display device to be an I/O component as well. Also, processors generally have memory in the form of cache. It is recognized that such is the nature of the art, and reiterate that the diagram of FIG. 10 is merely illustrative of an example computing device that can be used in connection with one or more embodiments of the present disclosure. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000, and includes both volatile and non-volatile media, removable and non-removable media. By way of example, and not limitation, computer-readable media can comprise computer storage media and communication media.

Computer storage media include volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner at to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or non-volatile memory. As depicted, memory 1012 includes instructions 1024, when executed by processor(s) 1014 are configured to cause the computing device to perform any of the operations described herein, in reference to the above discussed figures, or to implement any program modules described herein. The memory can be removable, non-removable, or a combination thereof. Illustrative hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Illustrative presentation components include a display device, speaker, printing component, vibrating component, etc.

I/O ports 1018 allow computing device 1000 to be logically coupled to other devices including I/O components 1020, some of which can be built in. Illustrative components include a microphone, joystick, game pad, satellite dish, scanner, printer, wireless device, etc.

Many variations can be made to the illustrated embodiment of the present invention without departing from the scope of the present invention. Such modifications are within the scope of the present invention. Embodiments presented herein have been described in relation to particular embodiments which are intended in all respects to be illustrative rather than restrictive. Alternative embodiments and modifications would be readily apparent to one of ordinary skill in the art, but would not depart from the scope of the present invention.

From the foregoing it will be seen that this invention is one well adapted to attain all ends and objects hereinabove set forth together with the other advantages which are obvious and which are inherent to the structure. It will be understood that certain features and sub combinations are of utility and can be employed without reference to other features and sub combinations. This is contemplated by and is within the scope of the invention.

In the preceding detailed description, reference is made to the accompanying drawings which form a part hereof wherein like numerals designate like parts throughout, and in which is shown, by way of illustration, embodiments that can be practiced. It is to be understood that other embodiments can be utilized and structural or logical changes can be made without departing from the scope of the present disclosure. Therefore, the preceding detailed description is not to be taken in the limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments can be practiced with only some of the described aspects. For purposes of explanation, specific numbers, materials, and configurations are set forth in order to provide a thorough understanding of the illustrative embodiments. However, it will be apparent to one skilled in the art that alternate embodiments can be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules can be merged, broken into further sub-parts, and/or omitted.

The phrase "in one embodiment" or "in an embodiment" is used repeatedly. The phrase generally does not refer to the same embodiment; however, it can. The terms "comprising," "having," and "including" are synonymous, unless the context dictates otherwise. The phrase "A/B" means "A or B." The phrase "A and/or B" means "(A), (B), or (A and B)." The phrase "at least one of A, B, and C" means "(A), (B), (C), (A and B), (A and C), (B and C), or (A, B, and C)."

What is claimed is:

1. A computer-implemented method for virtual interaction with non-HMI devices, comprising:

activating, by a head-mounted display device (HMD), a user profile during initialization of the HMD based on received authentication information, wherein the user profile comprises one or more passwords associated with the user profile;

receiving, by the HMD, wireless sensor data associated with a plurality of non-HMI devices determined to be within a field of view of an optical input device coupled to the HMD;

identifying, by the HMD, each non-HMI device of the plurality of non-HMI devices based at least in part on the received wireless sensor data;

providing for display, by the HMD, a plurality of text references for the identified plurality of non-HMI devices, each text reference of the plurality of text references corresponding to one of the plurality of non-HMI devices;
receiving, by the HMD, a voice command that includes a first text reference of the displayed plurality of text references, the first text reference corresponding to a first non-HMI device of the identified plurality of non-HMI devices;
responsive to the received voice command, authenticating, by the HMD, a launch of an application linked to the first text reference utilizing a first password associated with the activated user profile;
based on the receipt of the voice command, providing for at least one of display and audio output, by the HMD, information associated with the first non-HMI device via the launched application, wherein access to the information associated with the first non-HMI device is authenticated, by a server device, based on the first password associated with the activated user profile, wherein the information associated with the first non-HMI device includes a prompt to perform an operation that corresponds to at least the first non-HMI device;
receiving, by the HMD, an additional voice command that corresponds to a displayed second text reference corresponding to a second non-HMI device of the identified plurality of non-HMI devices;
responsive to the received additional voice command, authenticating, by the HMD, a launch of a second application linked to the second text reference utilizing a second password associated with the activated user profile; and
based on the receipt of the additional voice command, providing for at least one of display and audio output, by the HMD, additional information associated with the second non-HMI device via the launched second application, wherein access to the additional information associated with the second non-HMI device is authenticated, by the server device, based on the second password associated with the activated user profile.

2. The method of claim 1, further comprising:
receiving, by the HMD, an additional voice command that corresponds to the included prompt to perform the operation; and
providing for at least one of display and audio output, by the HMD, additional information associated with the operation and received from the server device responsive to the received additional voice command.

3. The method of claim 1, wherein the provided information includes one of an indication that virtual interaction with the first non-HMI device has begun, or diagnostic information associated with the first non-HMI device.

4. The method of claim 1, wherein the wireless sensor data includes one or more of Bluetooth data, Wi-Fi data, RFID data, NFC data, or radio data.

5. The method of claim 4, wherein each non-HMI device of the at least one non-HMI device within the field of view of the optical input device is identified based further in part on one or more of scanned code recognition, Bluetooth signal recognition, RFID tag recognition, and any other location indicator recognition performed by the HMD utilizing one of the received wireless sensor data or optical data as the optical data is being received from the optical input device.

6. The method of claim 1, wherein each non-HMI device of the at least one non-HMI device within the field of view of the optical input device is identified based further in part on the object recognition of the non-HMI device while the non-HMI device is within the field of view of the optical input device.

7. The method of claim 1, wherein the associated information is received from the first non-HMI device via the server device.

8. The method of claim 1, wherein the associated information corresponds to a workflow for maintaining the first non-HMI device.

9. At least one computer storage media, having instructions stored thereon that, when executed by at least one processor, cause the at least one processor to:
activate, by a head-mounted display device (HMD), a user profile during initialization of the HMD based on received authentication information, wherein the user profile comprises one or more passwords associated with the user profile;
receive, by the HMD, wireless sensor data associated with a plurality of non-HMI devices determined to be within a field of view of an optical input device coupled to the HMD;
identify, by the HMD, each non-HMI device of the plurality of non-HMI devices based at least in part on the received wireless sensor data;
provide for display, by the HMD, a plurality of text references for the identified plurality of non-HMI devices, each text reference of the plurality of text references corresponding to one of the plurality of non-HMI devices;
receive, by the HMD, a voice command that includes a first text reference of the displayed plurality of text references, the first text reference corresponding to a first non-HMI device of the identified plurality of non-HMI devices;
responsive to the received voice command, authenticate, by the HMD, a launch of an application linked to the first text reference utilizing a first password associated with the activated user profile;
based on the receipt of the voice command, provide for at least one of display and audio output, by the HMD, information associated with the first non-HMI device via the launched application, wherein access to the information associated with the first non-HMI device is authenticated, by a server device, based on the first password associated with the activated user profile, wherein the information associated with the first non-HMI device includes a prompt to perform an operation that corresponds to at least the first non-HMI device;
receive, by the HMD, an additional voice command that corresponds to a displayed second text reference corresponding to a second non-HMI device of the identified plurality of non-HMI devices;
responsive to the received additional voice command, authenticate, by the HMD, a launch of a second application linked to the second text reference utilizing a second password associated with the activated user profile; and
based on the receipt of the additional voice command, provide for at least one of display and audio output, by the HMD, additional information associated with the second non-HMI device via the launched second application, wherein access to the additional information associated with the second non-HMI device is authenticated, by the server device, based on the second password associated with the activated user profile.

10. The computer storage media of claim 9, further comprising:

receive, by the HMD, an additional voice command that corresponds to the included prompt to perform the operation; and provide for at least one of display and audio output, by the HMD, additional information associated with the operation and received from the server device responsive to the received additional voice command.

11. The computer storage media of claim 9, wherein the provided information includes one of an indication that virtual interaction with the first non-HMI device has begun, or diagnostic information associated with the first non-HMI device.

12. The computer storage media of claim 9, wherein the wireless sensor data includes one or more of Bluetooth data, Wi-Fi data, RFID data, NFC data, or radio data.

13. The computer storage media of claim 12, wherein each non-HMI device of the at least one non-HMI device within the field of view of the optical input device is identified based further in part on one or more of scanned code recognition, Bluetooth signal recognition, RFID tag recognition, and any other location indicator recognition performed by the HMD utilizing one of the received wireless sensor data or optical data as the optical data is being received from the optical input device.

14. The computer storage media of claim 9, wherein each non-HMI device of the at least one non-HMI device within the field of view of the optical input device is identified based further in part on the object recognition of the non-HMI device while the non-HMI device is within the field of view of the optical input device.

15. The computer storage media of claim 9, wherein the associated information is received from the first non-HMI device via the server device.

16. The computer storage media of claim 9, wherein the associated information corresponds to a workflow for maintaining the first non-HMI device.

17. A computerized system comprising:
a head-mounted display device (HMD) having a microphone, a set of sensors, at least one optical device, at least one processor, and at least one computer storage media storing computer-useable instructions that, when executed by the at least one processor, cause the at least one processor to:
activate, by the HMD, a user profile during initialization of the HMD based on received authentication information, wherein the user profile comprises one or more passwords associated with the user profile;
receive, by the HMD, wireless sensor data associated with a plurality of non-HMI devices determined to be within a field of view of an optical input device coupled to the HMD;
identify, by the HMD, each non-HMI device of the plurality of non-HMI devices based at least in part on the received wireless sensor data;
provide for display, by the HMD, a plurality of text references for the identified plurality of non-HMI devices, each text reference of the plurality of text references corresponding to one of the plurality of non-HMI devices;
receive, by the HMD, a voice command that includes a first text reference of the displayed plurality of text references, the first text reference corresponding to a first non-HMI device of the identified plurality of non-HMI devices;
responsive to the received voice command, authenticate, by the HMD, a launch of an application linked to the first text reference utilizing a first password associated with the activated user profile;
based on the receipt of the voice command, provide for at least one of display and audio output, by the HMD, information associated with the first non-HMI device via the launched application, wherein access to the information associated with the first non-HMI device is authenticated, by a server device, based on the first password associated with the activated user profile, wherein the information associated with the first non-HMI device includes a prompt to perform an operation that corresponds to at least the first non-HMI device;
receive, by the HMD, an additional voice command that corresponds to a displayed second text reference corresponding to a second non-HMI device of the identified plurality of non-HMI devices;
responsive to the received additional voice command, authenticate, by the HMD, a launch of a second application linked to the second text reference utilizing a second password associated with the activated user profile; and
based on the receipt of the additional voice command, provide for at least one of display and audio output, by the HMD, additional information associated with the second non-HMI device via the launched second application, wherein access to the additional information associated with the second non-HMI device is authenticated, by the server device, based on the second password associated with the activated user profile.

18. The computerized system of claim 17, further comprising:
receive, by the HMD, an additional voice command that corresponds to the included prompt to perform the operation; and
provide for at least one of display and audio output, by the HMD, additional information associated with the operation and received from the server device responsive to the received additional voice command.

19. The computerized system of claim 17, wherein the provided information includes one of an indication that virtual interaction with the first non-HMI device has begun, or diagnostic information associated with the first non-HMI device.

20. The computerized system of claim 17, wherein the wireless sensor data includes one or more of Bluetooth data, Wi-Fi data, RFID data, NFC data, or radio data.

* * * * *